US011026165B2

(12) United States Patent
Forsman et al.

(10) Patent No.: US 11,026,165 B2
(45) Date of Patent: Jun. 1, 2021

(54) RADIO NETWORK NODE, NETWORK NODE, DATABASE, CONFIGURATION CONTROL NODE, AND METHODS PERFORMED THEREBY

(71) Applicant: Telefonaktiebolaget LM Ericsson (publ), Stockholm (SE)

(72) Inventors: Mats Forsman, Rönninge (SE); Tomas Thyni, Järfälla (SE); Jari Vikberg, Järna (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 346 days.

(21) Appl. No.: 16/063,821

(22) PCT Filed: Jan. 11, 2016

(86) PCT No.: PCT/EP2016/050352
§ 371 (c)(1),
(2) Date: Sep. 16, 2018

(87) PCT Pub. No.: WO2017/121454
PCT Pub. Date: Jul. 20, 2017

(65) Prior Publication Data
US 2020/0275356 A1     Aug. 27, 2020

(51) Int. Cl.
*H04W 48/18*     (2009.01)
*H04L 12/24*     (2006.01)
(Continued)

(52) U.S. Cl.
CPC ......... *H04W 48/18* (2013.01); *H04L 41/0803* (2013.01); *H04W 24/02* (2013.01); *H04W 92/10* (2013.01)

(58) Field of Classification Search
CPC ..... H04W 48/08; H04W 48/12; H04W 48/18; H04W 24/02; H04W 24/04; H04W 92/00;
(Continued)

(56) References Cited

U.S. PATENT DOCUMENTS

| 2014/0086177 A1 | 3/2014 | Adjakple et al. |
| 2015/0063166 A1* | 3/2015 | Sif ...................... G06F 9/45558 370/254 |

(Continued)

OTHER PUBLICATIONS

Liang et al., "Wireless Network Virtualization: A Survey, Some Research Issues and Challenges," ResearchGate, IEEE Communications Surveys & Tutorials—Jul. 2014, 25 pages, Aug. 24, 2014.
(Continued)

*Primary Examiner* — Kevin D Mew
(74) *Attorney, Agent, or Firm* — Patent Portfolio Builders, PLLC

(57) ABSTRACT

Embodiments herein relate to a method performed by a radio network node for enabling communication for a wireless device in a communication network, which communication network comprises a core network with partitioned sets of functionalities, where a first core network node supports a first set of functionalities out of a total set of functionalities in the core network, and the first set of functionalities belongs to a first network slice of the core network and is separated from another set of functionalities. The radio network node receives a connection request from the wireless device comprising an indication, which indication indicates connection to the first network slice. The radio network node retrieves configuration information from a network node for establishing the connection interface, for RAN and/or CN, to the first network slice, and establishes the connection interface towards the first core network node using the retrieved configuration information.

14 Claims, 18 Drawing Sheets

(51) Int. Cl.
*H04W 24/02* (2009.01)
*H04W 92/10* (2009.01)

(58) Field of Classification Search
CPC ...... H04W 92/10; H04W 92/14; H04L 41/08; H04L 41/0803; H04L 41/0806
See application file for complete search history.

(56) References Cited

U.S. PATENT DOCUMENTS

| | | | |
|---|---|---|---|
| 2016/0353465 A1* | 12/2016 | Vrzic | H04W 28/0247 |
| 2017/0164349 A1* | 6/2017 | Zhu | H04W 28/0247 |
| 2017/0257823 A1* | 9/2017 | Ashwood-Smith | H04B 17/12 |
| 2017/0332212 A1* | 11/2017 | Gage | H04L 41/0806 |
| 2017/0367036 A1* | 12/2017 | Chen | H04L 43/08 |
| 2018/0063135 A1* | 3/2018 | Hahn | H04W 48/16 |
| 2018/0310238 A1* | 10/2018 | Opsenica | H04W 12/06 |
| 2018/0317163 A1* | 11/2018 | Lee | H04W 16/02 |
| 2018/0332441 A1* | 11/2018 | Shaw | H04L 41/12 |
| 2019/0045351 A1* | 2/2019 | Zee | H04W 48/18 |
| 2019/0174563 A1* | 6/2019 | Dowlatkhah | H04W 24/02 |
| 2019/0327153 A1* | 10/2019 | Wahlqvist | H04L 41/5003 |

OTHER PUBLICATIONS

International Search Report and Written Opinion of the International Searching Authority for International Application No. PCT/EP2016/050352 dated Mar. 16, 2016.
Open Networking Foundation, www.opennetworking.org, 1 page, Dec. 18, 2015.
Nguyen et al., "SDN and Virtualization-Based LTE Mobile Network Architectures: A Comprehensive Survey," Wireless Personal Communications vol. 86, No. 3, 38 pages, Aug. 6, 2015.
Sparc, "Update on Split Architecture for Large Scale Wide Area Networks," Deliverable D3.2, ICT-258457, 93 pages, Dec. 31, 2011.
European Office Action issued in corresponding EP Application No. 16700338.3 dated May 8, 2019, 08 pages. The reference cited therein has previously been made of record.

* cited by examiner

RADIO NETWORK NODE, NETWORK NODE, DATABASE, CONFIGURATION CONTROL NODE, AND METHODS PERFORMED THEREBY

CROSS REFERENCE TO RELATED APPLICATION

This application is a 35 U.S.C. § 371 national stage application of PCT International Application No. PCT/EP2016/050352, filed on Jan. 11, 2016, the disclosure and content of which is incorporated by reference herein in its entirety.

TECHNICAL FIELD

Embodiments herein relate to a radio network node, a network node, a database, a configuration control node, and methods performed thereby for communication. Furthermore, a computer program and a computer readable storage medium are also provided herein. In particular, embodiments herein relate to enabling communication for a wireless device in the communication network.

BACKGROUND

In a typical communication network, wireless devices, also known as wireless communication devices, mobile stations, stations (STA) and/or user equipments (UE), communicate via a Radio Access Network (RAN) to one or more core networks (CN). The RAN covers a geographical area which is divided into service areas or cell areas, with each service area or cell area being served by a radio network node such as a radio access node e.g., a Wi-Fi access point or a radio base station (RBS), which in some networks may also be denoted, for example, a "NodeB" or "eNodeB". A service area or cell area is a geographical area where radio coverage is provided by the radio network node. The radio network node communicates over an air interface operating on radio frequencies with the wireless device within range of the radio network node.

A Universal Mobile Telecommunications System (UMTS) is a third generation (3G) telecommunication network, which evolved from the second generation (2G) Global System for Mobile Communications (GSM). The UMTS terrestrial radio access network (UTRAN) is essentially a RAN using wideband code division multiple access (WCDMA) and/or High Speed Packet Access (HSPA) for user equipments. In a forum known as the Third Generation Partnership Project (3GPP), telecommunications suppliers propose and agree upon standards for third generation networks, and investigate enhanced data rate and radio capacity. In some RANs, e.g. as in UMTS, several radio network nodes may be connected, e.g., by landlines or microwave, to a controller node, such as a radio network controller (RNC) or a base station controller (BSC) in GSM, which supervises and coordinates various activities of the plural radio network nodes connected thereto. This type of connection is sometimes referred to as a backhaul connection. The RNCs and BSCs are typically connected to one or more core networks.

Specifications for the Evolved Packet System (EPS), also called a Fourth Generation (4G) network, have been completed within the 3$^{rd}$ Generation Partnership Project (3GPP) and this work continues in the coming 3GPP releases, for example to specify a Fifth Generation (5G) network. The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio network nodes are directly connected to the EPC core network rather than to RNCs. In general, in E-UTRAN/LTE the functions of an RNC are distributed between the radio network nodes, e.g. eNodeBs in LTE, and the core network. As such, the RAN of an EPS has an essentially "flat" architecture comprising radio network nodes connected directly to one or more core networks, i.e. they are not connected to RNCs. To compensate for that, the E-UTRAN specification defines a direct interface between the radio network nodes, this interface being denoted the X2 interface. EPS is the Evolved 3GPP Packet Switched Domain. FIG. 1 is an overview of the EPC architecture. This architecture is defined in 3GPP TS 23.401 v.13.4.0 wherein a definition of a Packet Data Network Gateway (PGW), a Serving Gateway (S-GW), a Policy and Charging Rules Function (PCRF), a Mobility Management Entity (MME) and a wireless or mobile device (UE) is found. The LTE radio access, E-UTRAN, comprises one or more eNBs. FIG. 2 shows the overall E-UTRAN architecture and is further defined in for example 3GPP TS 36.300 v.13.1.0. The E-UTRAN comprises eNBs, providing a user plane comprising the protocol layers Packet Data Convergence Protocol (PDCP)/Radio Link Control (RLC)/Medium Access Control (MAC)/Physical layer (PHY), and a control plane comprising Radio Resource Control (RRC) protocol in addition to the user plane protocols towards the wireless device. The radio network nodes are interconnected with each other by means of the X2 interface. The radio network nodes are also connected by means of the S1 interface to the EPC, more specifically to the MME by means of an S1-MME interface and to the S-GW by means of an S1-U interface.

The S1-MME interface is used for control plane signaling between eNodeB/E-UTRAN and MME. The main protocols used in this interface are S1 Application Protocol (S1-AP) and Stream Control Transmission Protocol (SCTP). S1AP is the application Layer Protocol between the radio network node and the MME and SCTP for example guarantees delivery of signaling messages between MME and the radio network node. The transport network layer is based on Internet Protocol (IP).

A subset of the S1 interface provided functions are:
- S1-interface management functions such as S1 setup, error indication, reset and the radio network node and MME configuration update.
- UE Context Management functionality such as Initial Context Setup Function and UE Context Modification Function.
- E-UTRAN Radio Access Bearer (E-RAB) Service Management function e.g. Setup, Modify, Release.
- Mobility Functions for wireless devices in EPS Connection Management (ECM)-CONNECTED, e.g. Intra-LTE Handover and inter-3GPP-Radio Access Technology (RAT) Handover.
- S1 Paging function.
- Non Access Stratum (NAS) Signaling Transport function.

Establishment of the S1-MME interface on S1AP protocol level is shown in FIG. 3 as the S1 setup procedure. The purpose of the S1 Setup procedure is to exchange application level data needed for the radio network node and the MME to correctly interoperate on the S1 interface. The radio network node may initiate the procedure by sending an S1 SETUP REQUEST message to the MME once it has gained IP connectivity and it has been configured with at least one Tracking Area Indicator (TAI). The TAI(s) are used by the radio network node to locate IP-addresses of the different MMEs, possibly in same or different MME pools. The radio network node includes its global radio network node identity and other information in the S1 SETUP REQUEST message. The MME responds with an S1 SETUP RESPONSE message. This S1 SETUP RESPONSE message includes for example the Globally Unique MME identifier(s) (GUMMEI) of the MME.

An Initial Context Setup process is shown in FIG. 4. An INITIAL CONTEXT SETUP REQUEST message is sent by the MME to request the setup of a UE context or context of a wireless device. This INITIAL CONTEXT SETUP REQUEST message comprises information related to both the UE context and different E-RABs to be established. For each E-RAB the MME includes E-RAB Quality of Service (QoS) parameters such as QoS Class Identifier (QCI) and Allocation and Retention Priority (ARP). The QCI is a scalar that is used as a reference to radio access node-specific parameters that control bearer level packet forwarding treatment, e.g. scheduling weights, admission thresholds, queue management thresholds, link layer protocol configuration, etc., and that have been pre-configured by the operator owning the radio network node.

Current assumption is that the RAN-CN split is similar for 5G as for 4G, implying an (evolved) S1 interface. An INITIAL CONTEXT SETUP RESPONSE message is sent by eNB to the MME confirming the setup.

The wireless communication industry is at the verge of a unique business crossroads. The growing gap between capacity and demand is an urgent call for new approaches and alternative network technologies to enable mobile operators to achieve more with less. Today, mobile broadband data is growing at an annual rate of 40-50 percent per year in the U.S. and other regions globally. Mobile service providers address these rapidly expanding traffic volumes through deployment of additional network functions, which will be a significant capital expenditure (CAPEX) challenge. The nature of that mobile broadband data traffic is also evolving with new services including new video applications, connected cars and the Internet of Things (IoT). This rapid capacity growth and increasing traffic diversity in LTE networks stresses the assumptions of existing network architectures and operational paradigms.

Network Functions Virtualization (NFV) provides a new path that can increase the flexibility required by mobile service providers and network operators to adapt and accommodate this dynamic market environment. NFV is a new operational approach applying well-known virtualization technologies to create a physical Commercial Off-the-Shelf (COTS) distributed platform for the delivery of end-to-end services in the context of the demanding environment of telecom network infrastructure and applications.

Because EPC is critical to the realization and management of all LTE traffic, it is important to consider use cases related to virtualization of the EPC elements. Each individual EPC element also has specific considerations that determine whether to deploy with NFV. Virtualized EPC (vEPC) is a good example: Multiple virtualized network functions (VNF) can be deployed and managed on a Network Functions Virtualization Infrastructure (NFVI) but must cater for performance scalability in both signaling/control plane and user plane, each potentially demanding different levels of NFVI resources.

vEPC elements can benefit from more agile deployment and scalability. However, virtual resource monitoring and orchestration, along with service awareness, are essential for implementing elasticity effectively. Due to the nature of telecom networks, service Level Agreements (SLA) will be a key issue for a virtualized mobile core network. Because virtualization usually leads to a performance trade-off, equipment vendors must optimize data-plane processing to satisfy carrier-grade bandwidth and latency requirements and sufficient control-plane performance for SLAs needed to ensure availability of regulatory services, such as emergency calls.

VNF is a virtualized network function which serves as a VNF Software for providing virtual network capabilities. A VNF could be decomposed and instantiated for example in roles such as Virtualized MME (vMME), Virtualized PCRF (vPCRF), Virtualized S-GW (vS-GW) or Virtualized PDN-GW (vPDN-GW).

NFV is seen as an enabler for network slicing that is described herein.

When looking at the wide range of applications and use cases that are to be addressed with a 5G network, it is quite obvious that these cannot effectively be addressed with a traditional approach of having a purpose built network for each application. This will lead to high cost for networks and devices as well as inefficient use of valuable frequency resources. An operator may have one physical network infrastructure and one pool of frequency bands, which may support many separate virtualized networks, also called network slices. Each network slice may have unique characteristics for meeting the specific requirements of the use case/s it serves.

A key function of 5G Core network is to allow for flexibility in network service creation, making use of different network functions suitable for the offered service in a specific network slice, e.g. Evolved Mobile Broadband (MBB), Massive Machine Type Communication (MTC), Critical MTC, Enterprise, etc.

In addition to Service optimized networks there are more drivers for Network slicing, such as;

Business expansion by low initial investment: Given the existence of a physical infrastructure it is much easier to instantiate another Packet Core instance for the business expansion than to set up a new parallel infrastructure or even integrated nodes Low risk by no/limited impact on legacy: As the new instance is logically separated from the other network slices, the network slices can also provide resource isolation between each other. Thus introduction of a new isolated network slice will not impact the existing operator service and therefore only provide low risk Short Time To Market (TTM): The operators are concerned about the time it takes to set up the network for a new service. Slicing of the network for different services/operator use cases provides a separation of concern that can result in a faster setup of a network slice for a certain service as it is separately managed and with limited impact on other network slices Optimized use of resources: Today the network is supporting many different services but with new use cases and more diverging requirements there is a need for optimize the network for the specific type use case. Network slicing allows to match services to optimized network instances, and it also allows for a more optimized use of those specific resources Allows for individual network statistics: With service specific network slices and possibly even on the level of individual enterprises, there is a possibility of collecting network statistics specific for a limited and well defined group of users of the network slice. This may not be the key driver for slicing but rather a benefit that may be a useful tool Slicing can also be used to isolate different services in an operator's network. Future networks are expected to support new use cases going beyond the basic support for voice services and mobile broadband currently supported by existing cellular network, e.g. 2G/3G/4G. Some example use cases include:

Evolution of MBB
    Evolved communication services
    Cloud services
    Extended mobility and coverage
Mission critical Machine Type Communication
    Intelligent traffic systems
    Smart grid
    Industrial applications
Massive Machine Type Communication
    Sensors/actuators
    Capillary networks
Media
    Efficient on-demand media delivery
    Media awareness
    Efficient support for broadcast services These use cases are expected to have different performance requirements, e.g. bit-rates, latencies, as well as other network requirements, e.g. mobility, availability, security etc., affecting the network architecture and protocols.

Supporting these use cases could also mean that new players and business relations are needed compared to existing cellular networks. For instance it is expected that future network should address the needs of:

Enterprise services
Government services, e.g. national safety
Verticals industries, e.g. automation, transportation
Residential users These different users and services are also expected to put new requirements on the network. FIG. 5 shows an example of a network slicing for a case when there exist different network slices in the core network for MBB, Massive MTC and Critical MTC.

Network slicing introduces the possibility that the network slices are used for different services and use cases and there is a need to enable usage of this mechanism for wireless devices in the communication network to improve the performance of the communication network.

SUMMARY

An object of embodiments herein is to provide a mechanism for improving performance of the communication network in an efficient manner.

According to an aspect the object is achieved by a method for enabling communication for a wireless device in a communication network. The communication network comprises a radio network node, a network node, a configuration control node, and a database. The communication network comprises a core network with partitioned sets of functionalities where a first core network node supports a first set of functionalities out of a total set of functionalities in the core network of the communication network, and which first set of functionalities belongs to a first network slice of the core network and is separated from another set of functionalities out of the total set of functionalities in the core network. The radio network node receives a connection request from the wireless device comprising an indication, which indication indicates connection to the first network slice. The radio network node transmits a configuration request to the network node, requesting to establish a connection interface to the first network slice. The network node transmits a request to the configuration control node or within the network node, which request requests a configuration of a transport network between the radio network node associated with the wireless device and the first core network node. The configuration control node or the network node transmits a slice configuration request to the database for retrieving slice configuration information for the first network slice, and receives the slice configuration information from the database. The configuration control node or the network node transmits a transport request requesting a control network node for configuring the transport network. Upon confirmation of setup of the transport network, the network node transmits configuration information to the radio network node for establishing the connection interface to the first network slice. The radio network node establishes the connection interface towards the first core network node using the configuration information.

According to another aspect the object is achieved by a method performed by a radio network node for enabling communication for a wireless device in a communication network. The communication network comprises a core network with partitioned sets of functionalities where a first core network node supports a first set of functionalities out of a total set of functionalities in the core network of the communication network. The first set of functionalities belongs to a first network slice of the core network and is separated from another set of functionalities out of the total set of functionalities in the core network. The radio network node receives a connection request from the wireless device comprising an indication, which indication indicates connection to the first network slice. The radio network node retrieves a configuration information from a network node, for establishing a connection interface to the first network slice and the radio network node establishes the connection interface towards the first core network node using the retrieved configuration information.

According to another aspect the object is achieved by a method performed by a network node for enabling communication for a wireless device in a communication network. The communication network comprises a core network with partitioned sets of functionalities where a first core network node supports a first set of functionalities out of a total set of functionalities in the core network of the communication network. The first set of functionalities belongs to a first network slice of the core network and is separated from another set of functionalities out of the total set of functionalities in the core network. The network node receives a configuration request from a radio network node, requesting to establish a connection interface to the first network slice, and triggers a configuration of a transport network between the radio network node and the first core network node. The network node then initiates a transmission of configuring information, to the radio network node, for establishing the connection interface to the first network slice from the radio network node.

According to yet another aspect the object is achieved by a method performed by a configuration control node for enabling communication for a wireless device in a communication network. The communication network comprises a core network with partitioned sets of functionalities where a first core network node supports a first set of functionalities out of a total set of functionalities in the core network of the communication network. The first set of functionalities belongs to a first network slice of the core network and is separated from another set of functionalities out of the total set of functionalities in the core network. The configuration control node receives a request from a network node, which request requests a configuration of a transport network between a radio network node associated with the wireless device and the first core network node. The configuration control node transmits a slice configuration request to a database for retrieving slice configuration information for the first network slice, and receives the slice configuration information from the database. The configuration control node transmits a transport request requesting a control network node for configuring the transport network between the radio network node and the first core network node. The transport request comprises at least a part of the slice configuration information.

According to yet another aspect the object is achieved by a method performed by a database for enabling communication for a wireless device in a communication network. The communication network comprises a core network with partitioned sets of functionalities where a first core network node supports a first set of functionalities out of a total set of functionalities in the core network of the communication network, and which first set of functionalities belongs to a first network slice of the core network and is separated from another set of functionalities out of the total set of functionalities in the core network. The database receives a slice configuration request from a configuration control node for retrieving slice configuration information for the first network slice; and transmits the slice configuration information to the configuration control node.

According to yet still another aspect the object is achieved by a radio network node for enabling communication for a wireless device in a communication network. The communication network comprises a core network with partitioned sets of functionalities where a first core network node supports a first set of functionalities out of a total set of functionalities in the core network of the communication network. The first set of functionalities belongs to a first network slice of the core network and is separated from another set of functionalities out of the total set of functionalities in the core network. The radio network node is configured to receive a connection request from the wireless device comprising an indication, which indication indicates connection to the first network slice. The radio network node is configured to retrieve a configuration information from a network node, for establishing a connection interface to the first network slice. The radio network node is configured to establish the connection interface towards the first core network node using the retrieved configuration information.

According to a further aspect the object is achieved by a network node for enabling communication for a wireless device in a communication network. The communication network comprises a core network with partitioned sets of functionalities where a first core network node supports a first set of functionalities out of a total set of functionalities in the core network of the communication network. The first set of functionalities belongs to a first network slice of the core network and is separated from another set of functionalities out of the total set of functionalities in the core network. The network node is configured to receive a configuration request from a radio network node, requesting to establish a connection interface to the first network slice. The network node is configured to trigger configuration of a transport network between the radio network node and the first core network node. The network node is configured to initiate a transmission of configuring information, to the radio network node, for establishing the connection interface to the first network slice from the radio network node.

According to another aspect the object is achieved by a configuration control node for enabling communication for a wireless device in a communication network. The communication network comprises a core network with partitioned sets of functionalities where a first core network node supports a first set of functionalities out of a total set of functionalities in the core network of the communication network. The first set of functionalities belongs to a first network slice of the core network and is separated from another set of functionalities out of the total set of functionalities in the core network.

The configuration control node is configured to receive a request from a network node, which request requests a configuration of a transport network between a radio network node associated with the wireless device and the first core network node. The configuration control node is configured to transmit a slice configuration request to a database for retrieving slice configuration information for the first network slice; and to receive the slice configuration information from the database. The configuration control node is further configured to transmit a transport request requesting a control network node for configuring the transport network between the radio network node and the first core network node, which transport request comprises at least a part of the slice configuration information.

According to also another aspect the object is achieved by a database for enabling communication for a wireless device in a communication network, which communication network comprises a core network with partitioned sets of functionalities where a first core network node supports a first set of functionalities out of a total set of functionalities in the core network of the communication network. The first set of functionalities belongs to a first network slice of the core network and is separated from another set of functionalities out of the total set of functionalities in the core network. The database is configured to receive a slice configuration request from a configuration control node for retrieving slice configuration information for the first network slice. The database is configured to transmit the slice configuration information to the configuration control node.

It is furthermore provided herein a computer program comprising instructions, which, when executed on at least one processor, cause the at least one processor to carry out any of the methods above, as performed by the radio network node, the network node, the configuration control node or the database. It is additionally provided herein a computer-readable storage medium, having stored thereon a computer program comprising instructions which, when executed on at least one processor, cause the at least one processor to carry out the method according to any of the methods above, as performed by the radio network node, the network node, the configuration control node or the database.

Embodiments herein introduce a new functionality to establish the connection interface to the first core network node upon receiving the connection request from the wireless device. Thus, the connection interface is merely established when necessary and resources are used in an efficient manner leading to that the network slicing mechanism, improving the performance of the communication network, is implemented in an efficient manner. Hence, embodiments herein enable dynamic and automatic establishment of network slice specific RAN-CN interfaces based on the need for these slices in a specific part of the communication network, resulting in a reduced manual configuration and also saved RAN-CN interface resources both in the radio network node and in the first core network node.

BRIEF DESCRIPTION OF THE DRAWINGS

Embodiments will now be described in more detail in relation to the enclosed drawings, in which:

FIG. 8d is a schematic flowchart depicting a method in a communication network according to embodiments herein;

DETAILED DESCRIPTION

As part of developing embodiments herein, a problem will first be identified and discussed.

Figure 1:
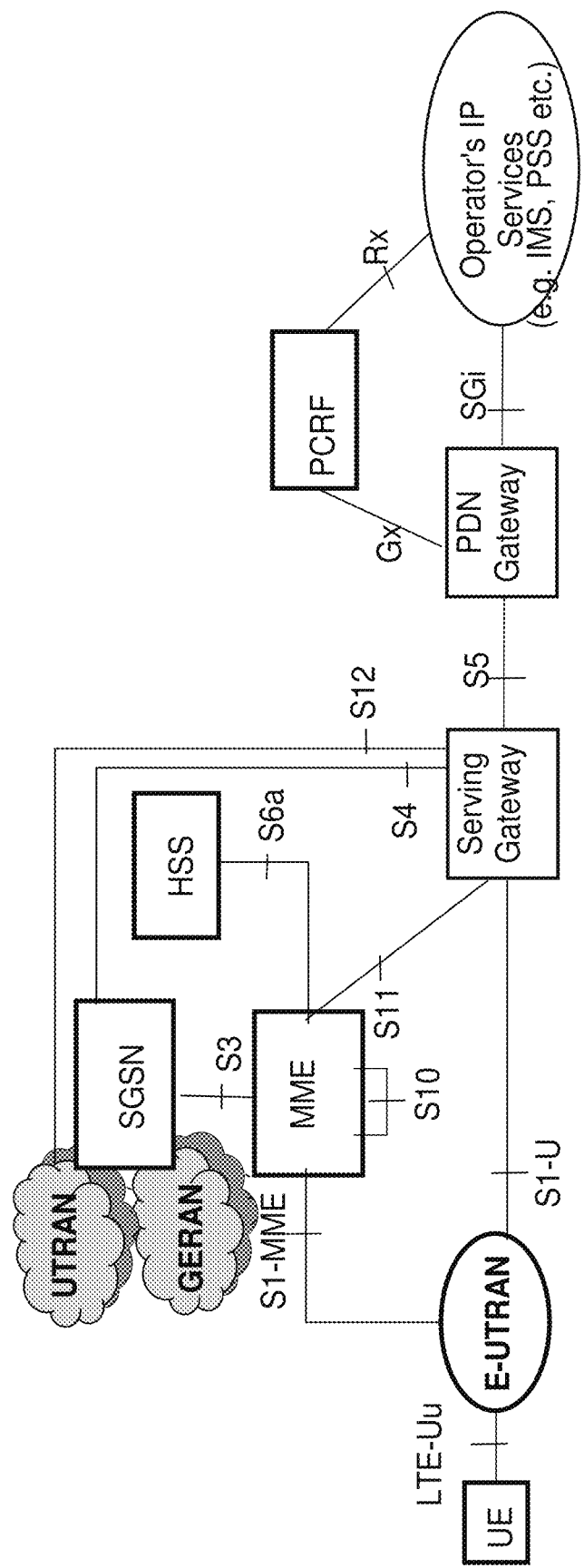
FIG. 1 is a schematic overview depicting a communication network according to prior art.
Figure 2:
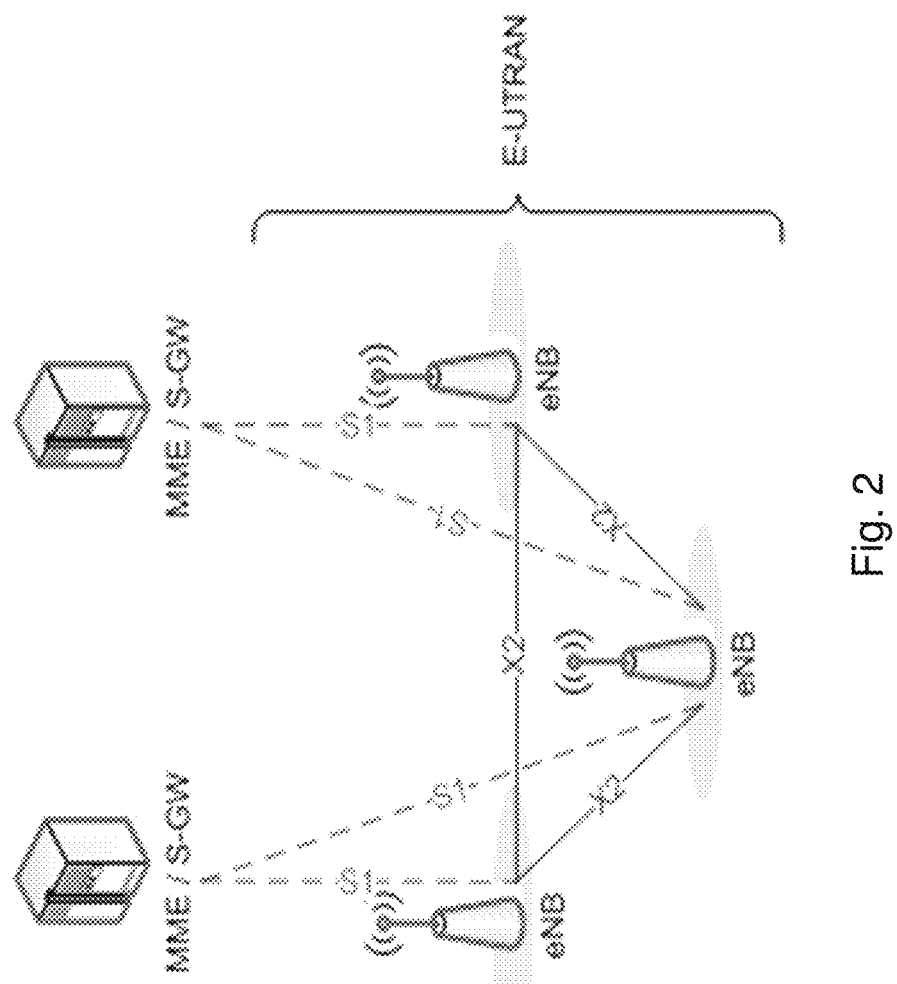
FIG. 2 is a schematic overview depicting a radio access network in connection with a core network.
Figure 3:
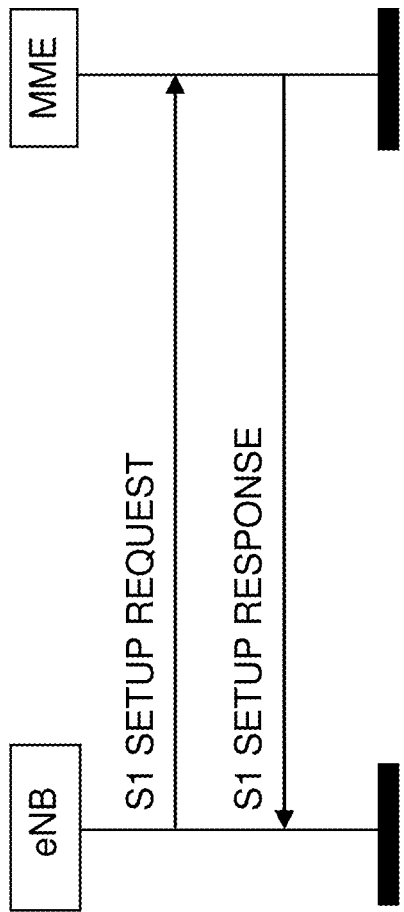
FIG. 3 is a signaling scheme according to prior art.
Figure 4:
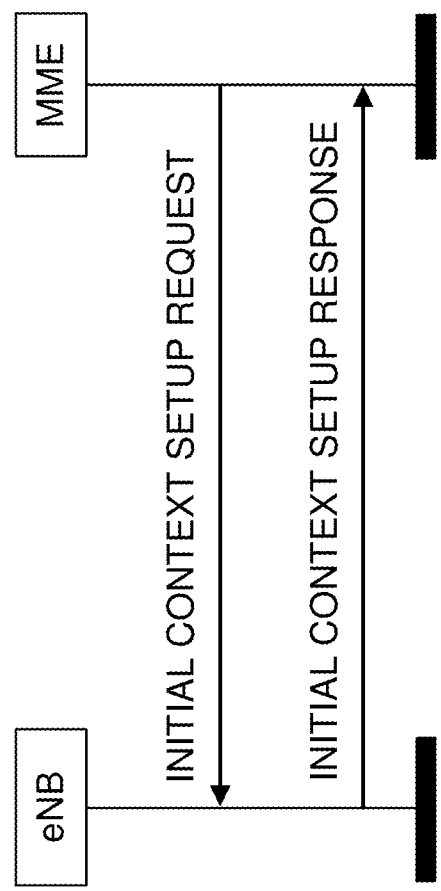
FIG. 4 is a signaling scheme according to prior art.
Figure 5:
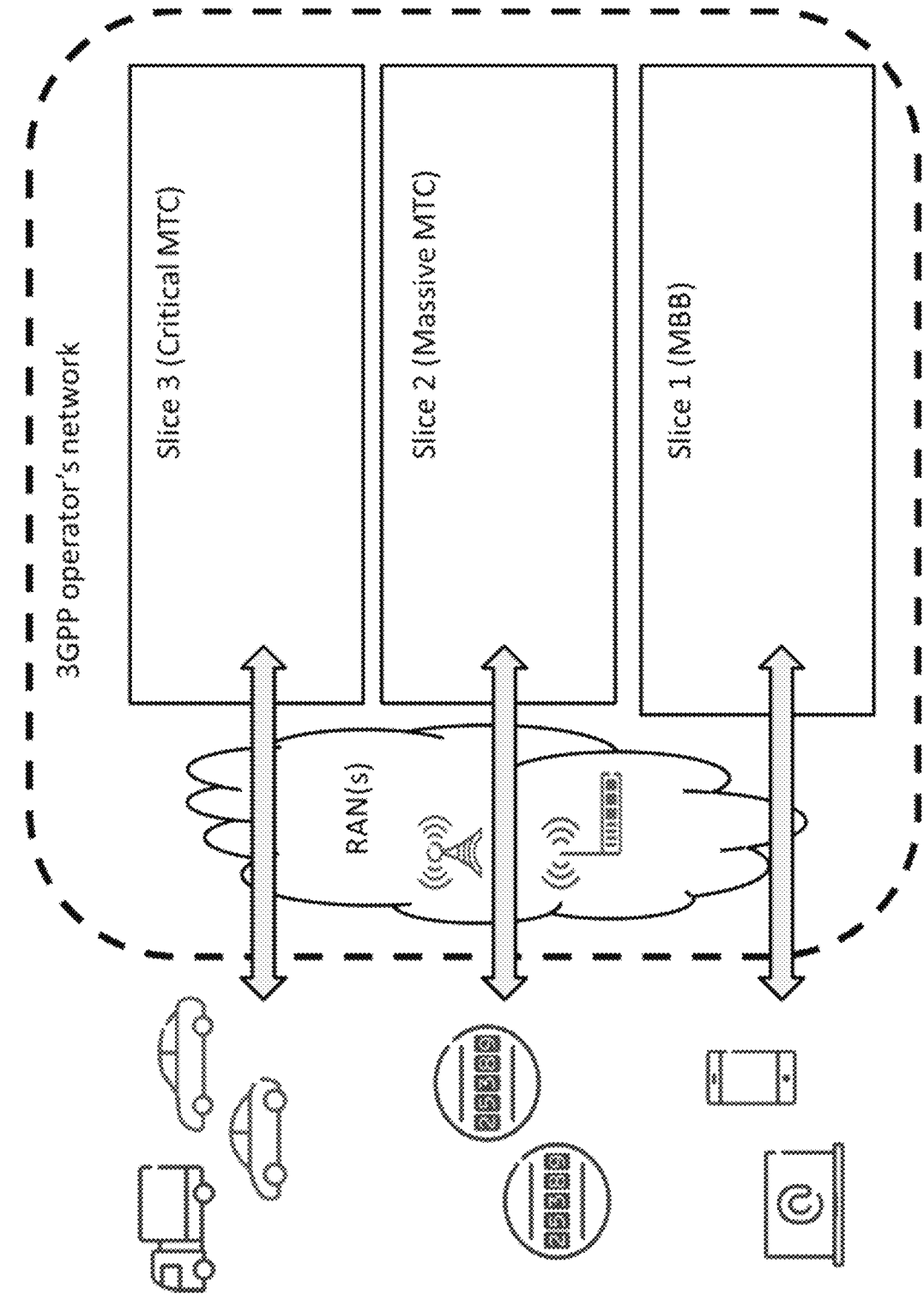
FIG. 5 is a schematic overview depicting an example of a slicing of a core network according to prior art.
Figure 6:
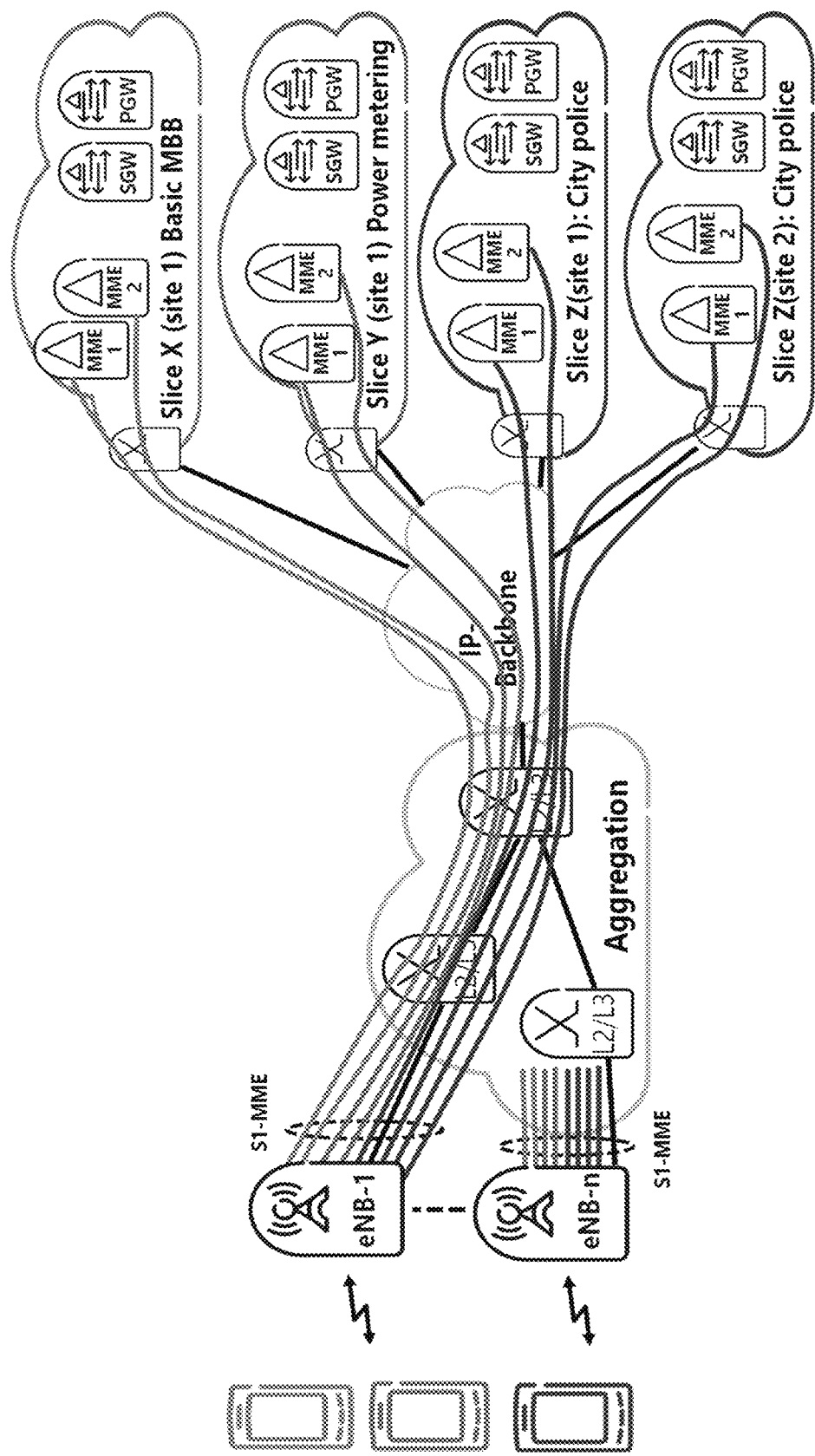
FIG. 6 is a schematic overview depicting full mesh of S1-MME interfaces according to the identified problem.

Network slicing introduces the possibility that the network slices, or core network slices, are used for different services and use cases. These services and use cases may introduce differences in the functionality supported in the different network slices. In addition, every radio network node of a RAN supporting a specific network slice needs to be connected to the corresponding CN resource part of the network slice. In a normal case, each such RAN-CN interface will consist of multiple instances of such interface. As an example, a radio network node may need to be connected to both an MME and a S-GW using network slice specific S1-MME and S1-U interfaces. In addition, a specific CN resource part of a network slice is very likely implemented as a pool of resources. This then means that each radio network node may need to be connected to multiple MMEs using multiple S1-MME interfaces. In a known solution each and every radio network node would be configured to connect to all CN resources supporting all known network slices, see FIG. 6 showing "full mesh" of S1-MME interfaces. Such a solution has multiple problems, especially for the case when not all network slices will be used all the time in all parts of the communication network. First, it means a lot of unnecessary configuration may be performed for all the network slices. Secondly, each radio network node would need to support a high number of S1-MME interfaces/connections and this is likely a scarce resource. One specific example of the problem may be a high number of SCTP connections as each S1-MME interface/connection also requires an SCTP connection on the transport protocol level. The same problem applies also on the CN side i.e. each MME in an MME-pool supporting specific network slice would need to support S1-MME connections from each radio network node in the communication network. Embodiments herein disclose an efficient solution for enabling network slicing in a communication network.

Figure 7:
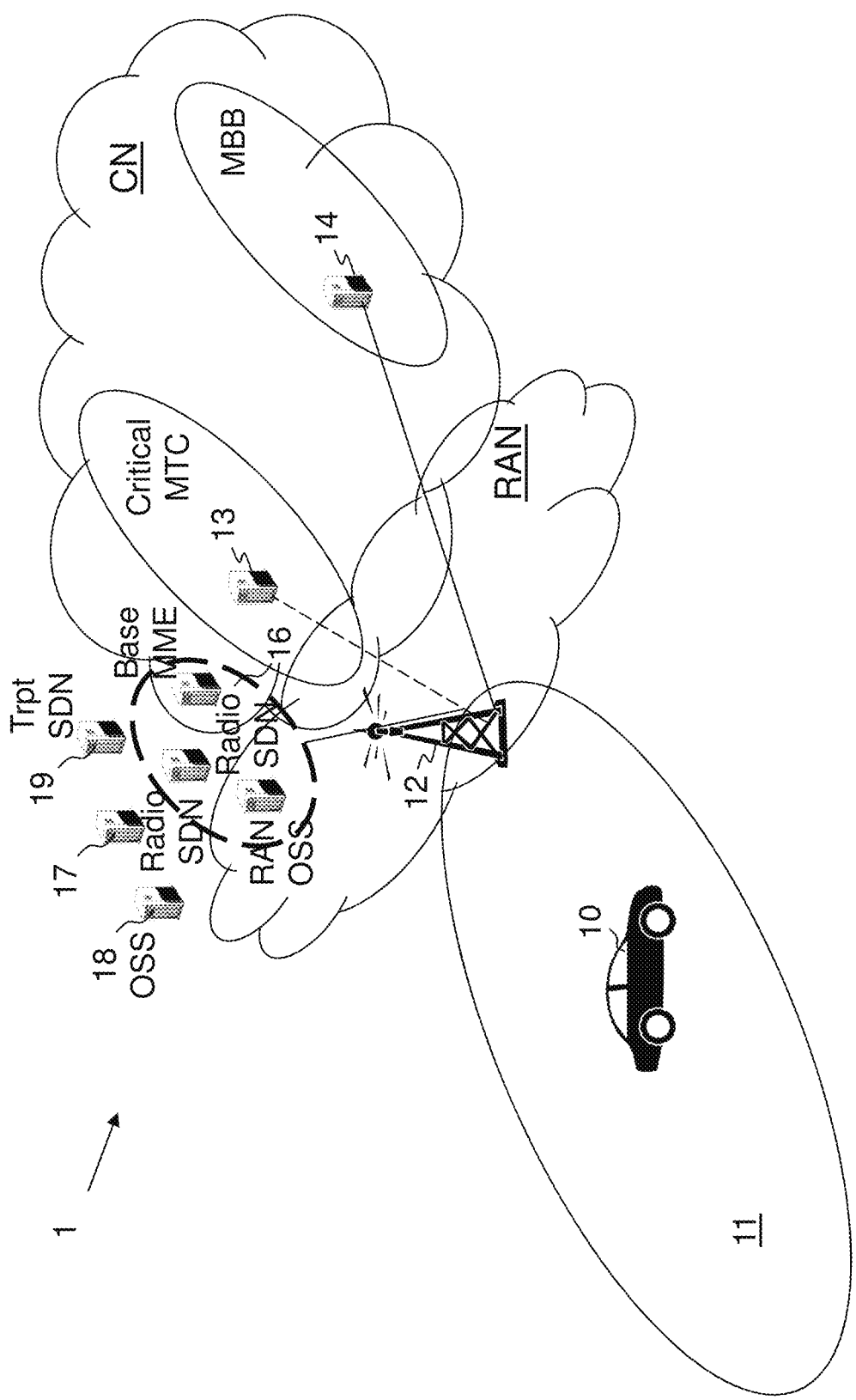
FIG. 7 is a schematic overview depicting a communication network 1 according to embodiments herein.

Embodiments herein relate to communication networks in general. FIG. 7 is a schematic overview depicting a communication network 1. The communication network 1 comprises one or more RANs and one or more CNs. The communication network 1 may use a number of different technologies, such as Wi-Fi, Long Term Evolution (LTE), LTE-Advanced, 5G, Wideband Code Division Multiple Access (WCDMA), Global System for Mobile communications/Enhanced Data rate for GSM Evolution (GSM/EDGE), Worldwide Interoperability for Microwave Access (WiMax), or Ultra Mobile Broadband (UMB), just to mention a few possible implementations. Embodiments herein relate to recent technology trends that are of particular interest in a 5G context, however, embodiments are applicable also in further development of the existing communication systems such as e.g. WCDMA and LTE.

In the communication network 1, wireless devices e.g. a wireless device 10 such as a mobile station, a non-access point (non-AP) STA, a STA, a user equipment and/or a wireless terminal, communicate via one or more Access Networks (AN), e.g. RAN, to one or more CNs. It should be understood by those skilled in the art that "wireless device" is a non-limiting term which means any terminal, wireless communication terminal, user equipment, Machine Type Communication (MTC) device, Device to Device (D2D) terminal, or node e.g. smart phone, laptop, mobile phone, sensor, relay, mobile tablets or even a base station communicating within a cell.

The communication network 1 comprises a radio network node 12 providing radio coverage over a geographical area, a first service area 11, of a first radio access technology (RAT), such as LTE, UMTS, Wi-Fi or similar. The radio network node 12 may be a radio access network node such as radio network controller or an access point such as a WLAN (Wireless Local Area Network) access point or an Access Point Station (AP STA), an access controller, a base station, e.g. a radio base station such as a NodeB, an evolved Node B (eNB, eNodeB), a base transceiver station, Access Point Base Station, base station router, a transmission arrangement of a radio base station, a stand-alone access point or any other network unit capable of serving a wireless device within the service area served by the radio network node 12 depending e.g. on the first radio access technology and terminology used.

Furthermore, the communication network 1 comprises a CN virtually network sliced into a number of network slices, each network slice or core network slice supports a type of wireless devices and/or a type of services i.e. each network slice supports a different set of functionalities. The communication network 1 comprises one or more network nodes 16, such as RAN Operation Support System (OSS) nodes, Radio Software Defined Networking (SDN) nodes, or core network nodes e.g. MMEs, Serving GPRS Support Nodes (SGSN), Serving Gateways (S-GW), Packet Data Network Gateways (PDN-GW or PGW) and/or corresponding nodes in e.g. a 5G network. GPRS meaning General Packet Radio Services. Network slicing introduces the possibility that the network slices are used for different services and use cases and these services and use cases may introduce differences in the functionality supported in the different network slices. Each network slice may comprise one or more network nodes or elements of network nodes providing the services/functionalities for the respective network slice. Each slice may comprise a core network node. For example, a first network slice for e.g. critical MTC devices may comprise a first core network node 13. A second network slice for e.g. MBB devices may comprise a second core network node 14. A core network node may comprise a User Plane node such as the S-GW and/or a Control Plane node such as the MME. Each network slice supports a set of functionalities out of a total set of functionalities in the communication network 1. E.g. the first core network node 13 supports a first set of functionalities out of the total set of functionalities in the communication network 1. The first set of functionalities is separated from a different set of functionalities out of the total set of functionalities in the communication network 1. E.g. the first set of functionalities being associated with Critical MTC devices is separated or logically separated, e.g. using separated data storage or processing resources, from a second set of functionalities of the second network slice.

The first set of functionalities may use one or more resources in a core network of the communication network, which one or more resources are separated from other resources used by a different set of functionalities, i.e. different network slices, out of the total set of functionalities in the communication network 1. The resources may then be dedicated or virtually dedicated for each set of functionalities or network slice. Thus, the core network node may be separated from other core network nodes supporting a second set of functionalities out of the total set of functionalities in the communication network. Separated meaning herein physical separated wherein the core network nodes may be executed on different hardware platforms and therefore using different resources of the hardware, and/or logically separated wherein the core network nodes may be executed on a same hardware platform and use different resources such as memory parts or resources of processor capacity but may also use some same resources of the hardware e.g. a single physical core network node may be partitioned into multiple virtual core network nodes.

Hence, the first core network node 13 supports the first set of functionalities out of the total set of functionalities in the core network of the communication network, which first set of functionalities belongs to the first network slice of the core network, and is separated from another set of functionalities out of the total set of functionalities in the core network.

A first example of such functionality in the first set of functionalities is active mode mobility support. The first network slice may support or the first set of functionalities may comprise:

- Both S1- and X2-based handovers, which is the normal current level of support;
- Only X2-based handover. This would have the benefit that the first network slice would not need to support any S1-based handover related functionality such as the relevant signaling on S1-interface and a handover routing function needed for S1-based handovers;
- Only S1-based handover. This would have the benefit that the first network slice would not need to support any X2-based handover related functionality such as the relevant signaling on S1-interface;
- No mobility support at all. This would have the benefit that the first network slice would not need to support any X2- or S1-based handover related functionality such as the relevant signaling on S1-interface and a handover routing function needed for S1-based handovers.

This is a non-exhaustive list of functionalities. There might be parts of the S1 and X2 handovers that could be supported/not supported. For example both S1 handover without S-GW relocation and X2 handover without S-GW relocation are simpler procedures than full S1 and X2 handovers as specified in the standard. Another example is that the S1 handover may be supported without the possibility to select a new MME during this procedure.

Another example of functionality support that could be indicated is related to the aspect of Control Plane (CP) and User Plane (UP) split. The first network slice may support or the first set of functionalities may comprise:

- Both "CP/UP split" and "Combined CP/UP". This would be the normal current level of support once both options are standardized. The "CP/UP split" is at least partly supported already today over the S1-interface as control plane is based on the S1-MME interface between the eNB and the MME, and user plane is based on the S1-U interface between the eNB and the S-GW. The "Combined CP/UP" means for example that both control and user plane are based on a single interface. One such example is to use the S1-MME for both user and control plane between the eNB and the MME. There is currently work ongoing in 3GPP for "Combined CP/UP", this work is called "Data over NAS" (DoNAS). This may typically be used for wireless devices that transmit only a small amount of data, e.g. an electricity meter sending a small amount of data relatively seldom.
- Only "CP/UP split". This would mean that the "Combined CP/UP" would not need to be supported on the core network side.
- Only "Combined CP/UP". This would mean that the "CP/UP split" would not need to be supported on the core network side. One additional example for this case is that the network slice or the radio network node 12 may not need to support any EPS bearers or procedures to create UE contexts in the RAN for the S1-U interface.

The above examples are to be seen only as examples and an indication of supported functionalities may be used to indicate any functionality that is visible in the S1-interface.

Furthermore, to control the configuration of a transport network for control plane as well as user plane a configuration control node 17, such as a Radio SDN node, is comprised in the communication network 1. Also, a database 18 such as an OSS node is also provided in the communication network 1 carrying all possible configuration information for the network slices in the communication network 1. The communication network 1 further comprises a control network node 19, e.g. a Transport SDN node, which configures the transport network within the communication network 1. A goal of network slicing is to direct the wireless device 10 to the correct network slice as early as possible and to avoid re-direction from one network slice to another, which breaks the isolation between the network slices. In order to avoid having all radio network nodes being configured for all possible network slices embodiments herein enable a dynamic setup of a connection interface to a network slice upon request from the wireless device 10. Thereby an efficient use of resources in the communication network 1 is provided as the configuration of the connection interface is only performed when needed for the wireless device 10. Thus, the radio network node 12 may by default always have a connection interface for e.g. MBB devices of the second network node 14 upon introduction into the communication network 1 but only set up, indicated by the dashed lines, the connection interface to the first network slice upon receiving the indication from the wireless device 10 requesting connection to the first network slice. Below are three ways described of dynamically setting up a connection interface between the radio network node 12 and the first core network node 13.

Figure 8A:
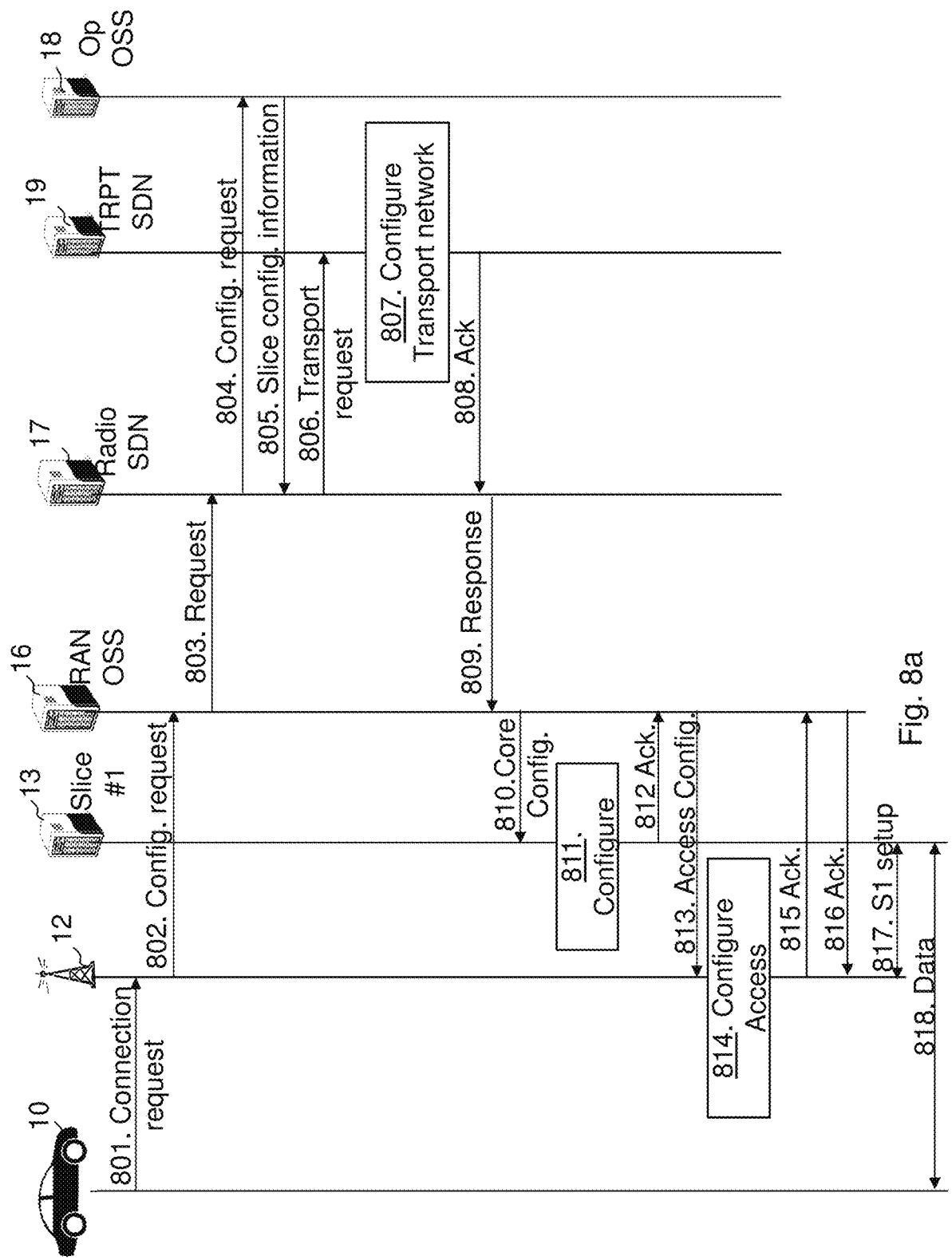
FIG. 8a is a combined flowchart and signaling scheme according to embodiments herein.

FIG. 8a is a combined flowchart and signaling scheme illustrating one embodiment of dynamically setting up the connection interface when requested by the wireless device 10. In this illustrated example the network node 16 is exemplified as a RAN OSS node.

Action 801. The wireless device 10 transmits to the radio network node 12 a connection request comprising an indication. The indication indicates connection to the first network slice. E.g. the connection request comprises a Slice ID of the first network slice.

Action 802. The radio network node 12 may determine that there is no locally configured connection interface for the first network slice indicated in the connection request. The radio network node 12 may check whether the Slice ID is active or not at the radio network node 12. When there is no connection interface configured for the first network slice, the radio network node 12 transmits a configuration request to the network node 16, requesting the configuration information and/or configuration of the transport network between the radio network node 12 and the first core network node 13. E.g. the radio network node 12 may request transport setup information, e.g. of the CN as well as the RAN, to the first network slice from the RAN OSS. The configuration request may comprise a Slice ID and Internet Protocol (IP) address of the radio network node 12. The configuration information may enable the radio network node 12 to establish the connection interface to the first core network node 13 e.g. establish an S1-MME interface and/or preconfigure an S1-U interface. The configuration information may also enable the radio network node 12 to configure the transport interface for the connection interface to the first core network node 13, e.g. local configuration of the transport interface in the radio network node, e.g. the Virtual Local Area Network (VLAN) ID to be used.

Action 803. The network node 16 in its turn transmits a request to the configuration control node 17, such as the Radio SDN node. The request may request the configuration of the transport network between the radio network node 12 and the first core network node 13. Thus, the network node 16 may resolve identifiers and/or IP addresses of the first core network node 13 by transmitting a RAN OSS request requesting slice transport setup information from the configuration control node 17. The request may comprise identifiers or IP addresses of the radio network node 12 and first core network node 13 and/or Slice ID.

Action 804. The configuration control node 17 transmits a slice configuration request to the database 18 for retrieving slice configuration information for the first network slice.

Action 805. The configuration control node 17 receives the slice configuration information from the database 18. The configuration control node 17 hence resolves Virtual Private Network (VPN) IDs and/or VLAN IDs, packet marking and policies from Slice ID. The configuration control node 17 may also resolve the IP addresses of the first core network node 13 in the case when identifiers of the first core network node 13 were received in step 803. The received slice configuration information may also contain related transport configuration, such as VPN IDs and/or VLAN IDs, that are stored and later provided to the network node 16 (to be used by the radio network node 12 and the first core network node 13 for local configuration of the transport interface). The slice configuration information may also contain information needed for the radio network node 12 to establish the communication interface to the first core network node 13 and this information is also stored at this stage. The database 18 has all transport configuration information, e.g. VLAN-ID's, VPN ID's etc. with local significance, for Radio and Core Network nodes, thus RAN/Core decides them. The control network node 19 will then map these attachment identifiers to the transport network used technologies and identifiers.

Action 806. The configuration control node 17 then transmits a transport request to the control network node 19 requesting the control network node 19, such as the transport SDN node, for configuring the transport network between the radio network node 12 and the first core network node 13. The transport request may comprise VPN IDs, IP addresses for the first core network node 13 and the radio network node 12, VLAN IDs, packet marking, and e.g. slice policies.

Action 807. The control network node 19 may then configure the transport network for enabling the wireless device 10 to connect to the first network slice. The control network node 19 may retrieve configuration information from the database 18 for the control network node 19. The control network node 19 may activate slice transport. The input may be VPN-ID, radio network node and first core network node IP addresses, VLAN IDs, packet marking and slice policies.

Action 808. The control network node 19 receives an acknowledgment (ACK) from the transport network and then acknowledges the configuration of the transport network as requested in action 806, back to the configuration control node 17.

Action 809. The configuration control node 17 transmits a response to the received request from the network node 16, see action 803, to the network node 16. In this response the slice configuration information, containing information needed for the radio network node 12 and first core network node 13 to establish the communication interface from radio network node to the first core network node, and the related transport configuration such as VPN IDs and/or VLAN IDs stored in step 805 may also be included. This response further comprises an ACK confirming the transport network setup as requested in action 803.

Action 810. The network node 16 may also function as a core network OSS and configure directly the first core network node 13. The network node 16 then transmits, to the first core network node 13, slice related transport configuration of the core network and/or the first core network node 13. The slice related transport configuration may contain the VPN IDs and/or VLAN IDs to be used by the first core network node 13. In another alternative, the network node 16 functions as a RAN OSS, and contacts a core network OSS that then performs the configuration of the first core network node 13.

Action 811. The first core network node 13 may then configure the core network and/or the first network node 13 based on the received slice related transport configuration.

Action 812. The first core network node 13 may confirm the reception and successful configuration of slice related transport configuration by transmitting an acknowledgment back to the network node 16 confirming the requested slice related transport configuration in action 810.

Action 813. The network node 16, being the RAN OSS node, may then further transmit the slice configuration information, containing information needed for the radio network node 12 to establish the communication interface to the first core network node 13, and slice related transport configuration for the radio access network and/or the radio network node 12, e.g. in an access configuration message. The network node 16 may also provide other slice configuration related information to the radio network node 12, e.g. in the access configuration message. Such other slice configuration information may comprise radio interface related information for the slice, for example slice priority in relation to other network slices in the radio network node 12, slice QoS configuration and slice identity.

Action 814. The radio network node 12 may then configure the radio access network and/or the radio network node 12 as the received slice related transport configuration.

Action 815. The radio network node 12 may confirm the reception and successful configuration of slice related transport configuration by transmitting an acknowledgment back to the network node 16, i.e. a confirmation of action 813.

Action 816 The network node 16 may then acknowledge back to RAN for slice transport setup. This is a response to the action 802, that the slice transport configuration is ready.

Action 817. The radio network node 12 may setup a S1 connection interface towards the first core network node e.g. a S1-MME interface. The connection interface is established towards the first core network node 13 using the retrieved slice configuration information. The radio network node 12 may store configuration information for a S1-U interface to the S-GW e.g. local transport configuration for later use. It should be noted that multiple S1-MME interfaces may be established, and multiple S1-U interfaces may be preconfigured. This may also be performed in action 814.

Action 818. The wireless device 10 may communicate with the first network slice using the established connection interface(s). Hence, the wireless device 10 may perform signaling and data over the established interface connection(s) e.g. signaling on the S1-MME interface and user data on the S1-U interface.

Figure 8B:
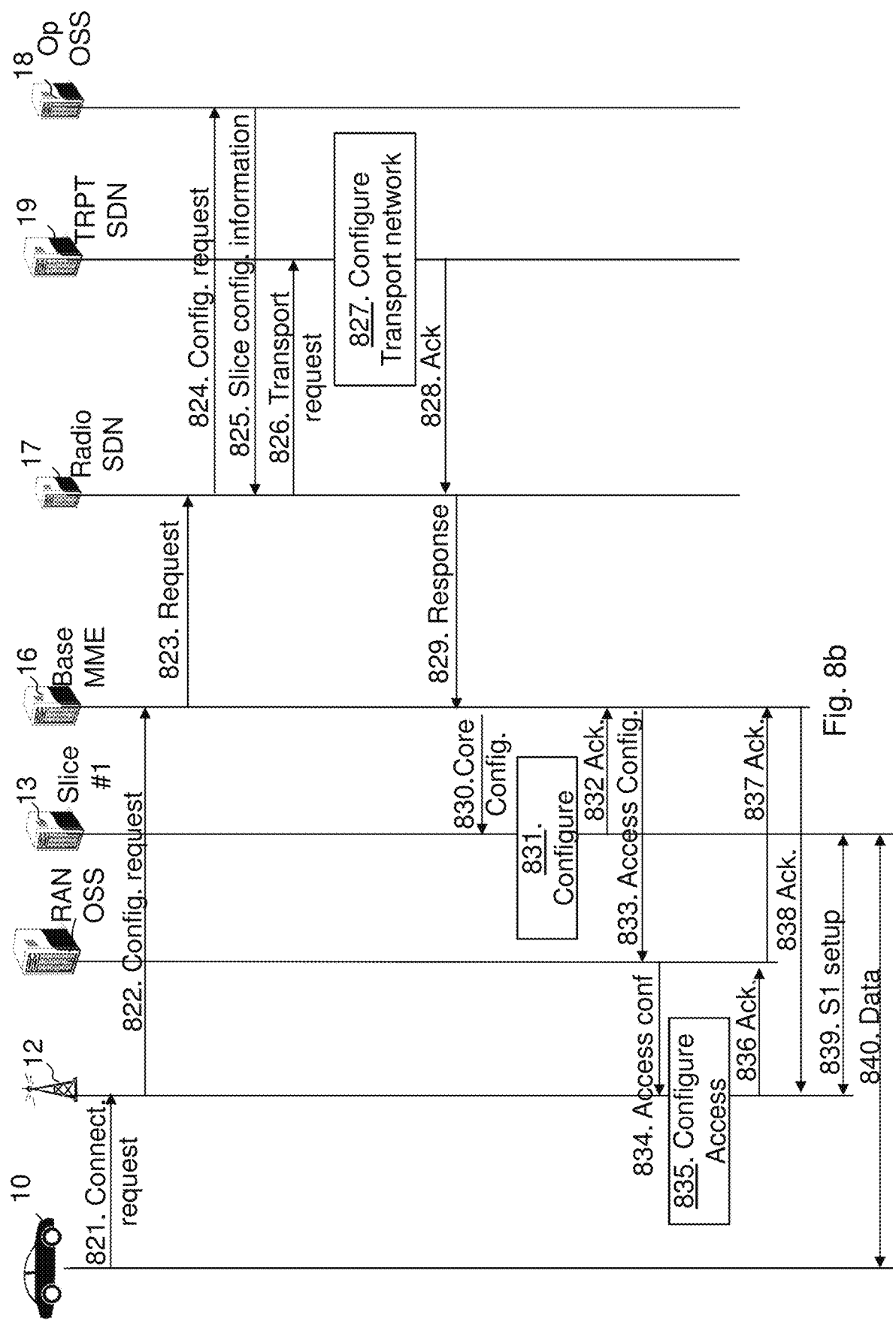
FIG. 8b is a combined flowchart and signaling scheme according to embodiments herein.

FIG. 8b is a combined flowchart and signaling scheme illustrating another embodiment of dynamically setting up the connection interface when requested by the wireless device 10. In this illustrated example the network node 16 is exemplified as a base MME being a collocated with an MME or a standalone node in the core network.

Action 821. The wireless device 10 transmits to the radio network node 12 the connection request comprising the indication. The indication indicates connection to the first network slice. E.g. the connection request comprises the Slice ID of the first network slice.

Action 822. The radio network node 12 may determine that there is no locally configured connection interface for the first network slice indicated in the connection request. The radio network node 12 may check whether the Slice ID is active or not at the radio network node 12. When there is no connection interface configured for the first network slice, the radio network node 12 transmits the configuration request to the network node 16, requesting the configuration information and/or configuration of the transport network between the radio network node 12 and the first core network node 13. E.g. the radio network node 12 may request transport setup information, e.g. of the CN as well as the RAN, to the first network slice from the Base MME. The configuration request may comprise the Slice ID and IP address of the radio network node 12. The configuration request may be implemented as S1AP signaling between the radio network node 12 and the base MME 16. The configuration information may enable the radio network node 12 to establish the connection interface to the first core network node 13 e.g. establish an S1-MME interface and/or preconfigure an S1-U interface. The configuration information may also enable the radio network node 12 to configure the transport interface for the connection interface to the first core network node 13, e.g. local configuration of the transport interface in the radio network node, e.g. the VLAN ID to be used.

Action 823. The network node 16 transmits a request to the configuration control node 17, such as the Radio SDN node. The request may request the configuration of the transport network between the radio network node 12 and the first core network node 13. Thus, the network node 16 may resolve identifiers and/or IP addresses of the first core network node 13 by transmitting a MME request requesting slice transport setup information from the configuration control node 17. The request may comprise identifiers or IP addresses of the radio network node 12 and first core network node 13 and/or Slice ID.

Action 824. The configuration control node 17 transmits a slice configuration request to the database 18 for retrieving slice configuration information for the first network slice.

Action 825. The configuration control node 17 receives the slice configuration information from the database 18. The configuration control node 17 hence resolves Virtual Private Network (VPN) IDs and/or VLAN IDs, packet marking and policies from Slice ID. The configuration control node 17 may also resolve the IP addresses of the first core network node 13 in the case when identifiers of the first core network node 13 were received in step 823. The received slice configuration information may also contain related transport configuration, such as VPN IDs and/or VLAN IDs, that are stored and later provided to the network node 16 (to be used by the radio network node 12 and the first core network node 13 for local configuration of the transport interface). The slice configuration information may also contain information needed for the radio network node 12 to establish the communication interface to the first core network node 13 and this information is also stored at this stage. The database 18 has all transport configuration information, e.g. VLAN-ID's, VPN ID's etc. with local significance, for Radio and Core Network nodes, thus RAN/Core decides them. The control network node 19 will then map these attachment identifiers to the transport network used technologies and identifiers.

Action 826. The configuration control node 17 then transmits the transport request to the control network node 19 requesting the control network node 19, such as the transport SDN node, for configuring the transport network between the radio network node 12 and the first core network node 13. The transport request may comprise VPN IDs, IP addresses for the MME and the radio network node 12, VLAN IDs, packet marking, and e.g. slice policies.

Action 827. The control network node 19 may then configure the transport network for enabling the wireless device 10 to connect to the first network slice. The control network node 19 may retrieve configuration information from the database 18 for the control network node 19. The control network node 19 may activate slice transport. The input may be VPN IDs, IP addresses for the MME and the radio network node 12, VLAN IDs, packet marking, and e.g. slice policies.

Action 828. The control network node 19 receives an ACK from the transport network and then acknowledges the configuration of the transport network as requested in action 826 back to the configuration control node 17.

Action 829. The configuration control node 17 transmits a response of the request in action 823 to the network node 16. In this response the slice configuration information (containing information needed for the radio network node 12 and first core network node 13 to establish the communication interface from radio network node to the first core network node) and the related transport configuration such as VPN IDs and/or VLAN IDs stored in step 825 may also be included. This response further comprises an ACK confirming the transport network setup as requested in action 823.

Action 830. The network node 16 may also function as a core network OSS and configure directly the first core network node 13. The network node 16 then transmits, to the first core network node 13, slice related transport configuration of the core network and/or the first core network node 13. The slice related transport configuration may contain the VPN IDs and/or VLAN IDs to be used by the first core network node 13. In another alternative, the network node 16 functions as a Base MME, and contacts a core network OSS that then performs the configuration of the first core network node 13.

Action 831. The first core network node 13 may then configure the core network and/or the first network node 13 based on the received slice related transport configuration.

Action 832. The first core network node 13 may confirm the reception and successful configuration of slice related transport configuration by transmitting an acknowledgment back to the network node 16 confirming the requested slice related transport configuration in action 830.

Action 833. The network node 16 may then further transmit the slice configuration information, containing information needed for the radio network node 12 to establish the communication interface to the first core network node 13, and slice related transport configuration for the radio access network and/or the radio network node 12, e.g. in an access configuration message to a RAN OSS node.

Action 834. The RAN OSS node may then transmit, to the radio network node 12, slice related transport configuration for the radio access network and/or the radio network node 12, e.g. in an access configuration message. The RAN OSS node may also provide other slice configuration related information to the radio network node 12, e.g. in the access configuration message. Such other slice configuration information may comprise radio interface related information for the slice, for example slice priority in relation to other network slices in the radio network node 12, slice QoS configuration and slice identity.

Action 835. The radio network node 12 may then configure the radio access network and/or the radio network node 12 as the received slice related transport configuration. Hence, the connection interface is established towards the first core network node 13 using the retrieved configuration information.

Action 836. The radio network node 12 may confirm the reception and successful configuration of slice related transport configuration by transmitting an acknowledgment back to RAN OSS confirming slice related transport configuration as requested in action 834.

Action 837. The RAN OSS may transmit an acknowledgment to the network node 16 for RAN slice Transport setup as requested by the slice configuration information in action 833.

Action 838. The network node 16 may then acknowledge back to RAN for slice transport setup as requested in the configuration request in action 822. The acknowledgment may be implemented as S1AP signaling between the radio network node 12 and the base MME 16.

Action 839. The radio network node 12 may setup a S1 connection interface towards the first core network node e.g. a S1-MME interface. The connection interface has been established towards the first core network node 13 using the retrieved slice configuration information. The radio network node 12 may store configuration information for a S1-U to the S-GW e.g. local transport configuration for later use. It should be noted that multiple S1-MME interfaces may be established. This may also be performed in action 835.

Action 840. The wireless device 10 may communicate with the first network slice using the established connection interface(s). Hence, the wireless device 10 may perform signaling and data over the established interface connection(s) e.g. signaling on the S1-MME interface and user data on the S1-U interface.

Figure 8C:
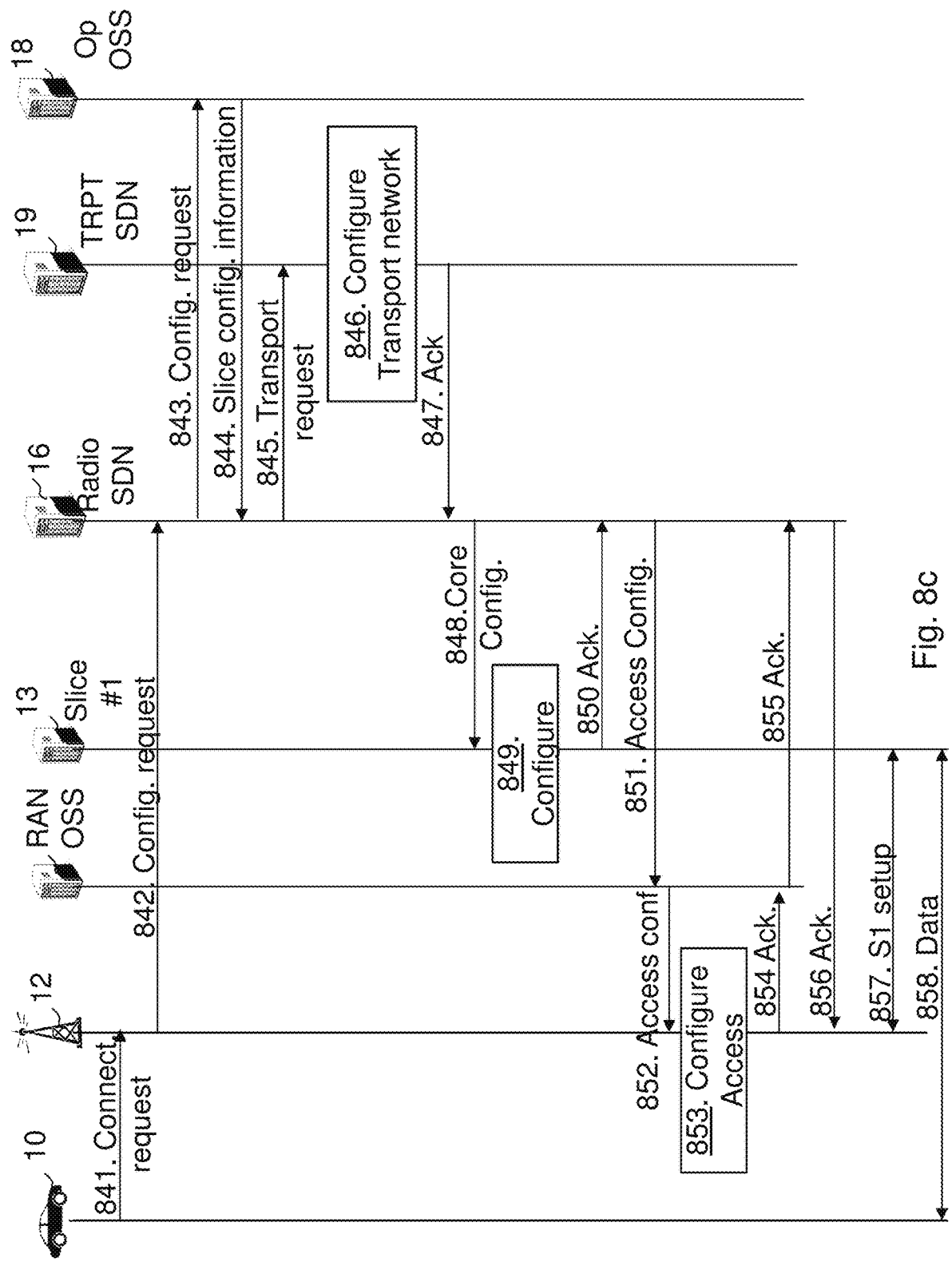
FIG. 8c is a combined flowchart and signaling scheme according to embodiments herein.

FIG. 8*c* is a combined flowchart and signaling scheme illustrating a third embodiment of dynamically setting up the connection interface when requested by the wireless device 10. In this illustrated example the network node 16 is exemplified as a radio SDN node, thus, acting as a combination of the network node 16 and the configuration control node 17 in FIGS. 8*a* and 8*b*.

Action 841. The wireless device 10 transmits to the radio network node 12 the connection request comprising the indication. The indication indicates connection to the first network slice. E.g. the connection request comprises the Slice ID of the first network slice.

Action 842. The radio network node 12 may determine that there is no locally configured connection interface for the first network slice indicated in the connection request. The radio network node 12 may check whether the Slice ID is active or not at the radio network node 12. When there is no connection interface configured for the first network slice, the radio network node 12 transmits the configuration request to the network node 16, requesting the configuration information and/or configuration of the transport network between the radio network node 12 and the first core network node 13. E.g. the radio network node 12 may request transport setup information, e.g. of the CN as well as the RAN, to the first network slice from the Radio SDN. The configuration request may comprise a Slice ID and Internet Protocol (IP) address of the radio network node 12. The configuration information may enable the radio network node 12 to establish the connection interface to the first core network node 13 e.g. establish an S1-MME interface and/or preconfigure an S1-U interface. The configuration information may also enable the radio network node 12 to configure the transport interface for the connection interface to the first core network node 13, e.g. local configuration of the transport interface in the radio network node, e.g. the VLAN ID to be used.

Action 843. The network node 16 transmits a slice configuration request to the database 18 for retrieving slice configuration information for the first network slice.

Action 844. The network node 16 receives the slice configuration information from the database 18. The network node 16 hence resolves Virtual Private Network (VPN) IDs and/or VLAN IDs, packet marking and policies from Slice ID. The network node 16 may also resolve the IP addresses of the first core network node 13 in the case when identifiers of the first core network node 13 were received in step 842. The received slice configuration information may also contain related transport configuration, such as VPN IDs and/or VLAN IDs, that are stored and later provided to the network node 16 (to be used by the radio network node 12 and the first core network node 13 for local configuration of the transport interface). The slice configuration information may also contain information needed for the radio network node 12 to establish the communication interface to the first core network node 13 and this information is also stored at this stage. The database 18 has all transport configuration information, e.g. VLAN-ID's, VPN ID's etc. with local significance, for Radio and Core Network nodes, thus RAN/Core decides them. The control network node 19 will then map these attachment identifiers to the transport network used technologies and identifiers.

Action 845. The network node 16 then transmits the transport request to the control network node 19 requesting the control network node 19, such as the transport SDN node, for configuring the transport network between the radio network node 12 and the first core network node 13. The transport request may comprise VPN ID, IP address for the MME and the radio network node 12, VLAN IDs, packet marking, and e.g. slice policies.

Action 846. The control network node 19 may then configure the transport network for enabling the wireless device 10 to connect to the first network slice. The control network node 19 may retrieve configuration information from the database 18 for the control network node 19. The control network node 19 may activate slice transport. The input may be VPN IDs, IP addresses for the MME and the radio network node 12, VLAN IDs, packet marking, and e.g. slice policies.

Action 847. The control network node 19 receives an ACK from the transport network and then acknowledges the configuration of the transport network back to the network node 16 as requested in action 845. In this acknowledgment the slice configuration information (containing information needed for the radio network node 12 to establish the communication interface to the first core network node) and the related transport configuration such as VPN IDs and/or VLAN IDs stored in step 844 may also be included.

Action 848. The network node may also function as a core network OSS and configure directly the first core network node 13. The network node 16 then transmits, to the first core network node 13, slice related transport configuration of the core network and/or the first core network node 13. The slice related transport configuration may contain the VPN IDs and/or VLAN IDs to be used by the first core network node 13. In another alternative, the network node 16 functions as a Radio SDN, and contacts a core network OSS that then performs the configuration of the first core network node 13.

Action 849. The first core network node 13 may then configure the core network and/or the first network node 13 based on the received slice related transport configuration.

Action 850. The first core network node 13 may confirm the reception and successful configuration of slice related transport configuration by transmitting an acknowledgment back to the network node 16 confirming the requested slice related transport configuration in action 848.

Action 851. The network node 16 may then further transmit slice related transport configuration for the radio access network and/or the radio network node 12, e.g. in an access configuration message to a RAN OSS node.

Action 852. The RAN OSS node may then transmit, to the radio network node 12, the slice configuration information, containing information needed for the radio network node 12 to establish the communication interface to the first core network node 13, and slice related transport configuration for the radio access network and/or the radio network node 12, e.g. in an access configuration message. The RAN OSS node may also provide other slice configuration related information to the radio network node 12, e.g. in the access configuration message. Such other slice configuration information may comprise radio interface related information for the slice, for example slice priority in relation to other network slices in the radio network node 12, slice QoS configuration and slice identity.

Action 853. The radio network node 12 may then configure the radio access network and/or the radio network node 12 as the received slice related transport configuration. Hence, the connection interface has been established towards the first core network node 13 using the retrieved configuration information.

Action 854. The radio network node 12 may confirm the reception and successful configuration of slice related transport configuration by transmitting an acknowledgment back to RAN OSS confirming slice related transport configuration as requested in action 852.

Action 855. The RAN OSS may transmit an acknowledgment back to the network node 16 for RAN slice Transport setup confirming slice related transport configuration as requested in action 851.

Action 856. The network node 16 may then acknowledge back to RAN for slice transport setup as requested in the configuration request in action 842.

Action 857. The radio network node 12 may setup a S1 connection interface towards the first core network node e.g. establish a S1-MME interface and/or S1-U interface. This may also be performed in action 853. The connection interface has been established towards the first core network node 13 using the retrieved slice configuration information. The radio network node 12 may store configuration information for a S1-U to the S-GW e.g. local transport configuration for later use. It should be noted that multiple S1-MME interfaces may be established.

Action 858. The wireless device 10 may communicate with the first network slice using the established connection interface. Hence, the wireless device 10 may perform signaling and data over the established interface connection(s) e.g. signaling on the S1-MME interface and user data on the S1-U interface.

Hence, embodiments herein provide different solutions for dynamic establishment of RAN-CN interfaces for network slicing. The solutions are all based on the wireless device 10 indicating to the radio network node 12 the wish to connect to a specific network slice whereby the radio network node 12 may detect that it doesn't currently have any established RAN-CN interfaces, such as S1-MME interfaces, for that particular network slice. The radio network node 12 then dynamically requests both retrieval of needed information to establish the RAN-CN interfaces, such as IP-addresses of the MMEs or S-GWs supporting the network slice requested by the wireless device 10, and to also configure the transport network to support the needed connectivity for the network slice specific RAN-CN interfaces.

The method actions for enabling communication for the wireless device 10 in the communication network 1 according to some embodiments herein will now be described with reference to a flowchart depicted in FIG. 8d. The actions do not have to be taken in the order stated below, but may be taken in any suitable order. Actions performed in some embodiments are marked with dashed boxes. The communication network comprises the radio network node 12, the network node 16 and/or the configuration control node 17, and a database 18. The communication network 1 comprises the core network with partitioned sets of functionalities where the first core network node 13 supports the first set of functionalities out of the total set of functionalities in the core network of the communication network. The first set of functionalities belongs to the first network slice of the core network and is separated from another set of functionalities out of the total set of functionalities in the core network.

Action 860. The radio network node 12 receives the connection request from the wireless device 10 comprising the indication, which indication indicates connection to the first network slice.

Action 861. The radio network node 12 transmits a configuration request to the network node 16, requesting to establish a connection interface to the first network slice.

Action 862. The network node 16 transmits the request to the configuration control node 17 or within the network node 16, which request requests the configuration of the transport network between the radio network node 12 associated with the wireless device 10 and the first core network node 13.

Action 863. The configuration control node 17 or the network node 16 transmits the slice configuration request to the database 18 for retrieving slice configuration information for the first network slice.

Action 864. The configuration control node 17 or the network node 16 receives the slice configuration information from the database 18.

Action 865. The configuration control node 17 or the network node 16 transmits the transport request requesting a control network node 19 for configuring the transport network.

Action 866. The network node 16 transmits configuration information, upon confirmation of setup transport network, to the radio network node for establishing a connection interface to the first network slice.

Action 867. The radio network node 12 then establishes the connection interface towards the first core network node 13 using the configuration information.

Figure 9:
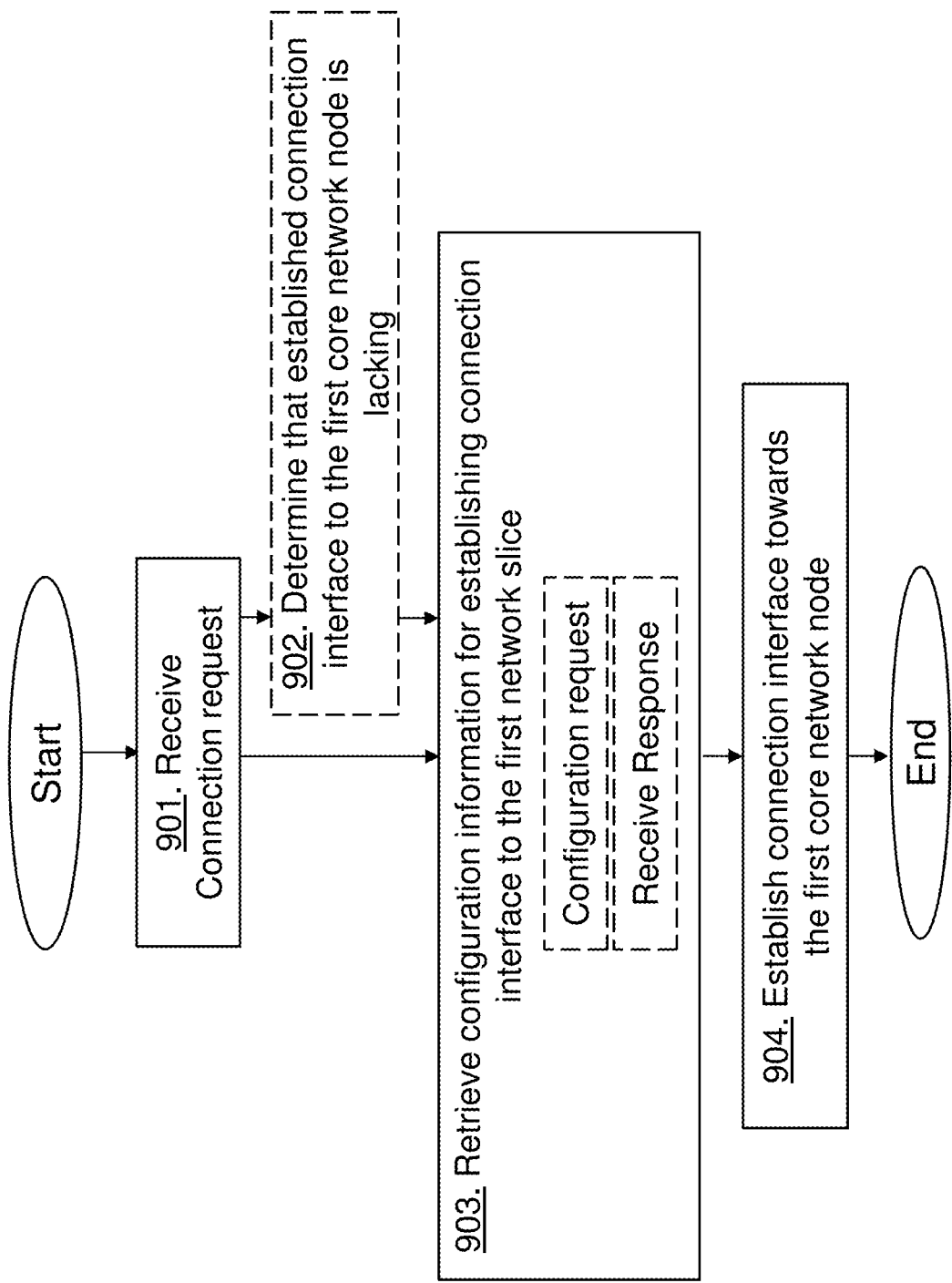
FIG. 9 is a schematic flowchart depicting a method performed by a radio network node according to embodiments herein.

The method actions performed by the radio network node 12 for enabling communication for the wireless device 10 in the communication network 1 according to embodiments herein will now be described with reference to a flowchart depicted in FIG. 9. The actions do not have to be taken in the order stated below, but may be taken in any suitable order. Actions performed in some embodiments are marked with dashed boxes. The communication network 1 comprises the core network with partitioned sets of functionalities where the first core network node 13, such as an MME or a S-GW, supports the first set of functionalities out of the total set of functionalities in the core network of the communication network 1. The first set of functionalities belongs to the first network slice of the core network and is separated from another set of functionalities out of the total set of functionalities in the core network.

Action 901. The radio network node 12 receives, from the wireless device 10, the connection request comprising an indication. The indication indicates connection to the first network slice. This step may comprise for example receiving a Radio Resource Control (RRC) Connection establishment in which the wireless device 10 indicates a Slice-ID for e.g. a "Power Metering" slice.

Action 902. The radio network node 12 may determine that an established connection interface to the first core network node 13 is lacking before retrieving the configuration information. That is, the radio network node 12 may check what network slices that are presently supported and configured, and when there is no configured connection interface, for example there are no RAN-CN interfaces such as S1-MME interfaces, for the first network slice the process is triggered to be initiated.

Action 903. The radio network node 12 retrieves the configuration information from the network node 16, for establishing the connection interface to the first network slice. The network node 16 may be, as stated above, a RAN OSS node, a Base MME, or a Radio SDN node. Establishing the connection interface herein meaning establishing e.g. control plane towards the MME of the first network slice and also storing the slice related transport configuration for user plane interface towards the S-GW of the first network slice. Embodiments herein configure a transport network towards the first core network node 13 and may also configure the MME and the S-GW to use correct Virtual Local Area Networks (VLAN) IDs, i.e. as configured in the transport network. The radio network node 12 may retrieve the configuration information by requesting in a configuration request, from the network node 16, the configuration information and/or configuration of the transport network between the radio network node 12 and the first core network node 13. The radio network node 12 may then receive a response comprising the configuration information from one network node, either the requested network node, see FIG. 8a, or a different network node such as a configuration control node 17 or another MME, or an Operation Support System node, such as the RAN OSS, see FIGS. 8b and 8c. Thus, the radio network node 12 may trigger a dynamic RAN-CN interface establishment for "Power Metering" slice towards a "Dynamic S1 function" for returning information needed to establish the RAN-CN interfaces for the first network slice. In addition, this action also triggers the configuration of the transport network for these RAN-CN interfaces. The "Dynamic S1 function" may return information needed to establish the RAN-CN interfaces. This information may comprise a set of MME IP-addresses or a TAI used for the first network slice. In the case when TAI is returned the radio network node 12 performs the above described DNS-based mapping from TAI to MME IP-addresses. Finally, the returned information may also comprise the mapping needed to establish the RAN-CN interfaces on the configured transport resources.

Action 904. The radio network node 12 establishes the connection interface towards the first core network node 13 using the retrieved configuration information. E.g. the radio network node 12 may use received network slice related transport configuration of the RAN and/or the radio network node 12. E.g. a S1 Setup procedure towards one or more core network nodes such as one or more MMEs is performed.

Figure 10:
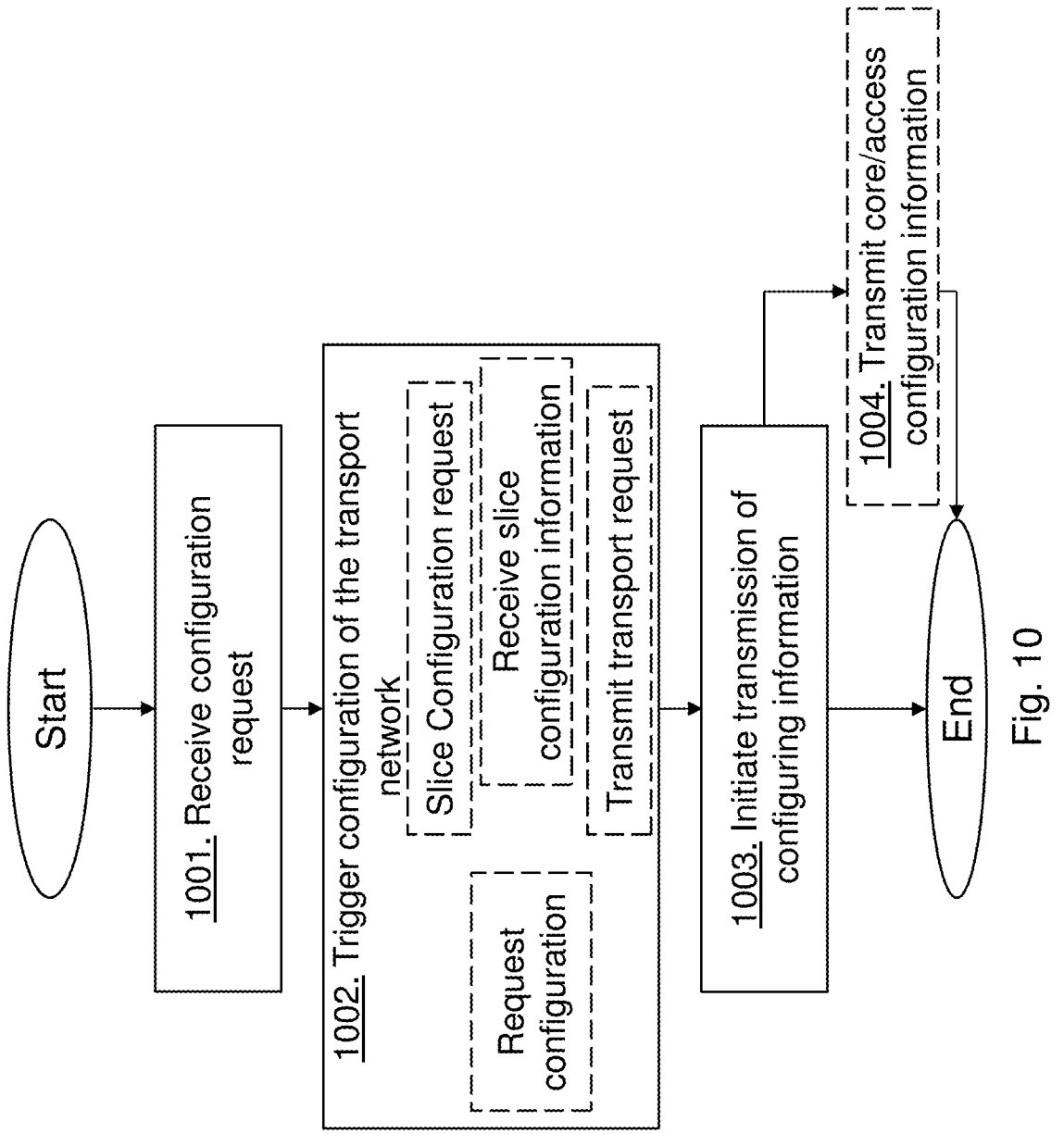
FIG. 10 is a schematic flowchart depicting a method performed by a network node according to embodiments herein.

The method actions performed by the network node 16 for enabling communication for the wireless device 10 in the communication network 1 according to embodiments herein will now be described with reference to a flowchart depicted in FIG. 10. The actions do not have to be taken in the order stated below, but may be taken in any suitable order. Actions performed in some embodiments are marked with dashed boxes. The communication network 1 comprises the core network with the partitioned sets of functionalities where the first core network node 13 supports the first set of functionalities out of the total set of functionalities in the core network of the communication network 1. The first set of functionalities belongs to the first network slice of the core network and is separated from another set of functionalities out of the total set of functionalities in the core network.

Action 1001. The network node 16 receives the configuration request from the radio network node 12, requesting to establish the connection interface to the first network slice.

Action 1002. The network node 16 triggers the configuration of the transport network between the radio network node 12 and the first core network node 13. The network node 16 may trigger the configuration by transmitting a request to the configuration control node 17, such as the Radio SDN node, see FIGS. 8a and 8b. The request may request the configuration of the transport network between the radio network node 12 and the first core network node 13. Furthermore, the network node 16 may trigger the configuration by transmitting a slice configuration request to the database 18, such as the OSS node, for retrieving slice configuration information for the first network slice, see FIG. 8c. The network node 16 may then receive the slice configuration information from the database 18; and then transmit a transport request requesting the control network node 19, such as a transport SDN node, for configuring the transport network between the radio network node 12 and the first core network node 13. The transport request comprises at least a part of the slice configuration information.

Action 1003. The network node 16 initiates the transmission of the configuring information, to the radio network node 12, for establishing the connection interface to the first network slice from the radio network node 12. The network node 16 may initiate the transmission of the configuring information by transmitting a request for radio transport configuration to an Operations Support System node, such as the RAN OSS, see FIGS. 8b and 8c.

Action 1004. The network node 16 may transmit core configuration information to the first core network node 13, which core configuration information informs local configuration of the core network to establish connection towards the radio network node 12. The network node 16 may transmit access configuration information to the radio network node 12, see FIG. 8a, which access configuration information informs configuration of the radio access network to establish connection towards the first core network node 13.

Figure 11:
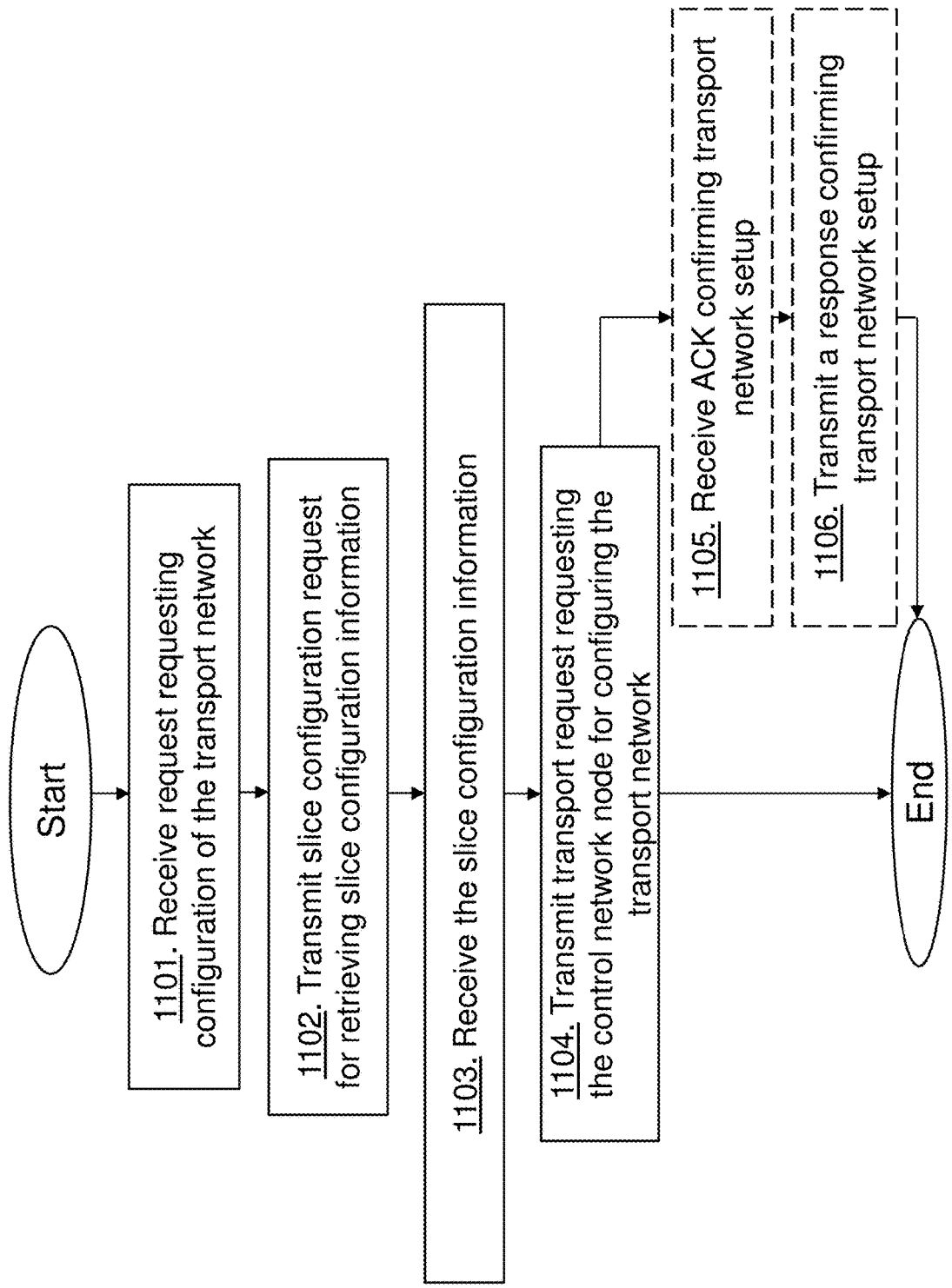
FIG. 11 is a schematic flowchart depicting a method performed by a configuration control node according to embodiments herein.

The method actions performed by the configuration control node 17, such as a Radio SDN node, for enabling communication for the wireless device 10 in the communication network 1 according to embodiments herein will now be described with reference to a flowchart depicted in FIG. 11. The actions do not have to be taken in the order stated below, but may be taken in any suitable order. Actions performed in some embodiments are marked with dashed boxes. The communication network 1 comprises the core network with the partitioned sets of functionalities where the first core network node 13 supports the first set of functionalities out of the total set of functionalities in the core network of the communication network. The first set of functionalities belongs to the first network slice of the core network and is separated from another set of functionalities out of the total set of functionalities in the core network.

Action 1101. The configuration control node 17 receives the request from the network node 16, which request requests the configuration of the transport network between the radio network node 12 associated with the wireless device 10 and the first core network node 13, see FIGS. 8a and 8b.

Action 1102. The configuration control node 17 transmits a slice configuration request to the database 18 for retrieving slice configuration information for the first network slice.

Action 1103. The configuration control node 17 receives the slice configuration information from the database 18.

Action 1104. The configuration control node 17 then transmits a transport request requesting the control network node 19, such as the transport SDN node, for configuring the transport network between the radio network node 12 and the first core network node 13. The transport request comprises at least a part of the slice configuration information, such as parts in the received slice configuration information relating to the transport network.

Action 1105. The configuration control node 17 may then receive an acknowledgment (ACK), from the control network node 19, confirming the transport network setup towards the first core network node 13.

Action 1106. The configuration control node 17 may further transmit a response, to the network node 16, confirming the transport network setup towards the first core network node 13. The response may be the same as the received ACK or be a different response, and may comprise configuration information for establishing the connection interface between the radio network node and the first core network node, e.g. including slice configuration Information for the radio network node 12 and first core network node 13.

Figure 12:
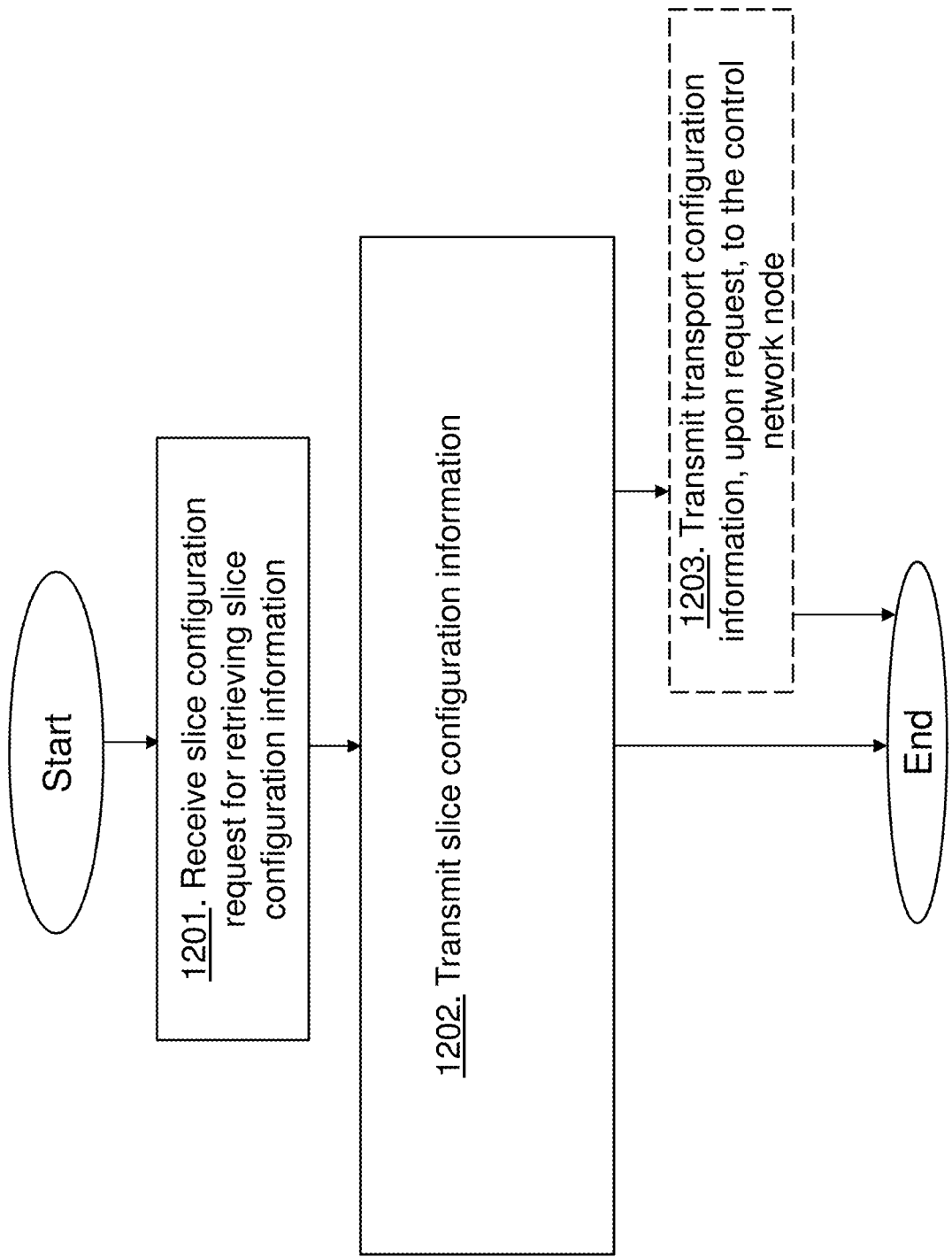
FIG. 12 is a schematic flowchart depicting a method performed by a database according to embodiments herein.

The method actions performed by the database 18, such as an OSS node e.g. a CN OSS node, for enabling communication for the wireless device 10 in the communication network 1 according to embodiments herein will now be described with reference to a flowchart depicted in FIG. 12. The actions do not have to be taken in the order stated below, but may be taken in any suitable order. Actions performed in some embodiments are marked with dashed boxes. The communication network 1 comprises the core network with the partitioned sets of functionalities where the first core network node 13 supports the first set of functionalities out of the total set of functionalities in the core network of the communication network. The first set of functionalities belongs to the first network slice of the core network and is separated from another set of functionalities out of the total set of functionalities in the core network.

Action 1201. The database 18 receives the slice configuration request from the configuration control node 17, e.g. the radio SDN node, for retrieving slice configuration information for the first network slice. The slice configuration information may comprise related transport configuration, such as VPN IDs and/or VLAN IDs, that are stored and later provided to the network node 16, to be used by the radio network node 12 and the first core network node 13 for local configuration of the transport interface. The slice configuration information may also contain information needed for the radio network node 12 to establish the communication interface to the first core network node 13. The database 18 has all transport configuration information, e.g. VLAN-ID's, VPN ID's etc. with local significance, for Radio and Core Network nodes, thus RAN/Core decides them.

Action 1202. The database 18 transmits the slice configuration information, e.g. for the CN and/or the RAN, to the configuration control node 17.

Action 1203. The database 18 may further transmit transport configuration information upon request from the control network node 19 to the control network node 19, which transport configuration information informs transport configuration of the transport network to establish connection between the radio network node 12 and the first core network node in the communication network 1. The database 18, acting as a core OSS node, may alternatively transmit core configuration information to the first core network node 13, which core configuration information informs configuration of the core network to establish connection towards a radio network node 12 in the communication network.

Embodiments herein are described using network slice specific RAN-CN interfaces for control plane as an example. One example is the S1-MME interfaces between the radio network node 12 and MME. Same or very similar aspects can also be applied for network slice specific RAN-CN interface for user plane. One example is the S1-U interfaces between the radio network node 12 and S-GW. One alternative for user plane is that the the radio network node 12 triggers the actions towards the transport network when it receives information about the S-GW IP-addresses and the characteristics of the different bearers to be established e.g. in the S1AP INITIAL CONTEXT SETUP REQUEST message. Another alternative would be that the MME performs the actions towards the transport domain. In addition, both alternatives are likely arranged in a way that not every UE context creation in the RAN will trigger actions towards the transport domain. This could be achieved by sort of "bulk-reservations" e.g. when the the radio network node 12 finds out about a new S-GW, it reserves more resources than needed for this wireless device 10 to also cater for additional wireless devices. Then new signaling towards the transport domain is needed first after the initial reservation is totally used.

Figure 13:
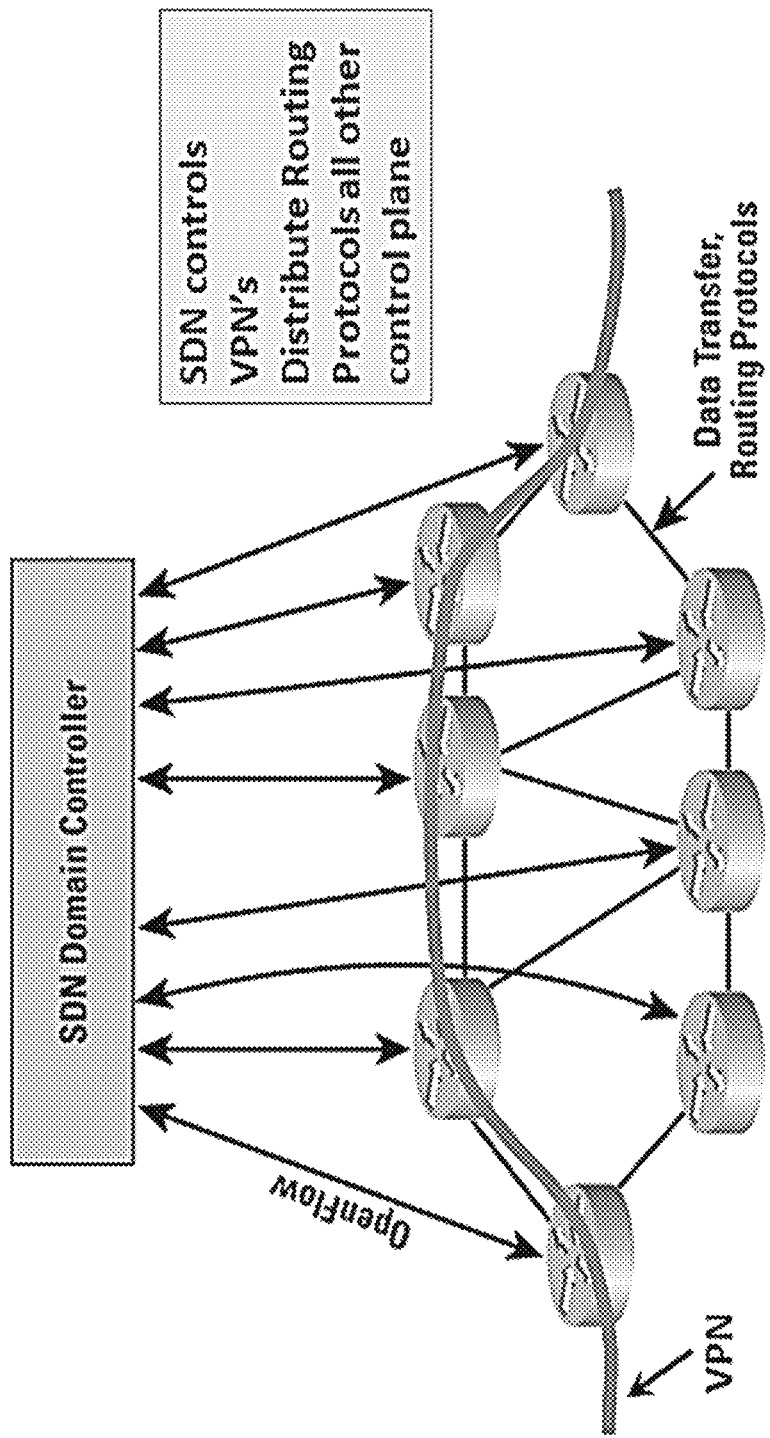
FIG. 13 is a schematic overview depicting a hybrid SDN architecture.

FIG. 13 is a schematic overview showing transport Software Defined Networking (SDN) procedure, disclosing a Transport SDN node denoted as SDN domain controller. SDN controls Virtual Private Network's (VPN) Distribute Routing Protocols or other control planes. Transport SDN is to separate a traditional transport node functions Control-plane and Data/User-plane into separate nodes and have one unified control protocol between control-plane server(s) and the data-plane nodes, e.g. switches and routers. The most common and standardized SDN control protocol today is OpenFlow, which is standardized by Open Networking Foundation (ONF). The OpenFlow enables controllers to determine a path of network packets through the network nodes, such as switches and routers. At least two controllers are recommended, a primary controller, and a secondary controller as backup. OpenFlow allows switches and routers from different suppliers, often each with their own proprietary interfaces and scripting languages, to be managed remotely using a single, open protocol. Hence, OpenFlow is an enabler of SDN.

OpenFlow allows remote administration of switches and routers packet forwarding tables, by adding, modifying and removing packet matching rules and actions. This way, routing decisions can be made periodically or ad hoc by the controller and translated into rules and actions with a configurable lifespan, which are then deployed to switches and routers flow table, leaving the actual forwarding of matched packets to the switch/router at wire speed for the duration of those rules. Packets which are unmatched by the switch/router can be forwarded to the controller. The controller may then decide to modify existing flow table rules on one or more switches/routers or to deploy new rules, to prevent a structural flow of traffic between switch/router and controller. It could even decide to forward the traffic itself, provided that it has told the switch/router to forward entire packets instead of just their header.

Hybrid SDN is a communication network where both traditional networking control protocols and SDN protocols operate in a same environment. Hybrid SDN allows the network owner to introduce new SDN technologies like OpenFlow to legacy environments without a complete overhaul of the communication network architecture.

In a hybrid SDN, SDN technologies and standard switching/routing protocols may run simultaneously on the physical hardware. A network manager can configure the SDN control plane to discover and control certain traffic flows while traditional, distributed networking control protocols continue to direct the rest of the traffic on the network, see example in FIG. 13.

The OpenFlow v1.3 standard includes specifications for hybrid interactions between OpenFlow and non-OpenFlow traffic to enable early SDN migration. It specifies two kinds of OpenFlow-compliant nodes: pure OpenFlow and hybrid. Many network hardware vendors who have added hardware support to their switches and routers offer the ability to run them in hybrid mode.

Figure 14:
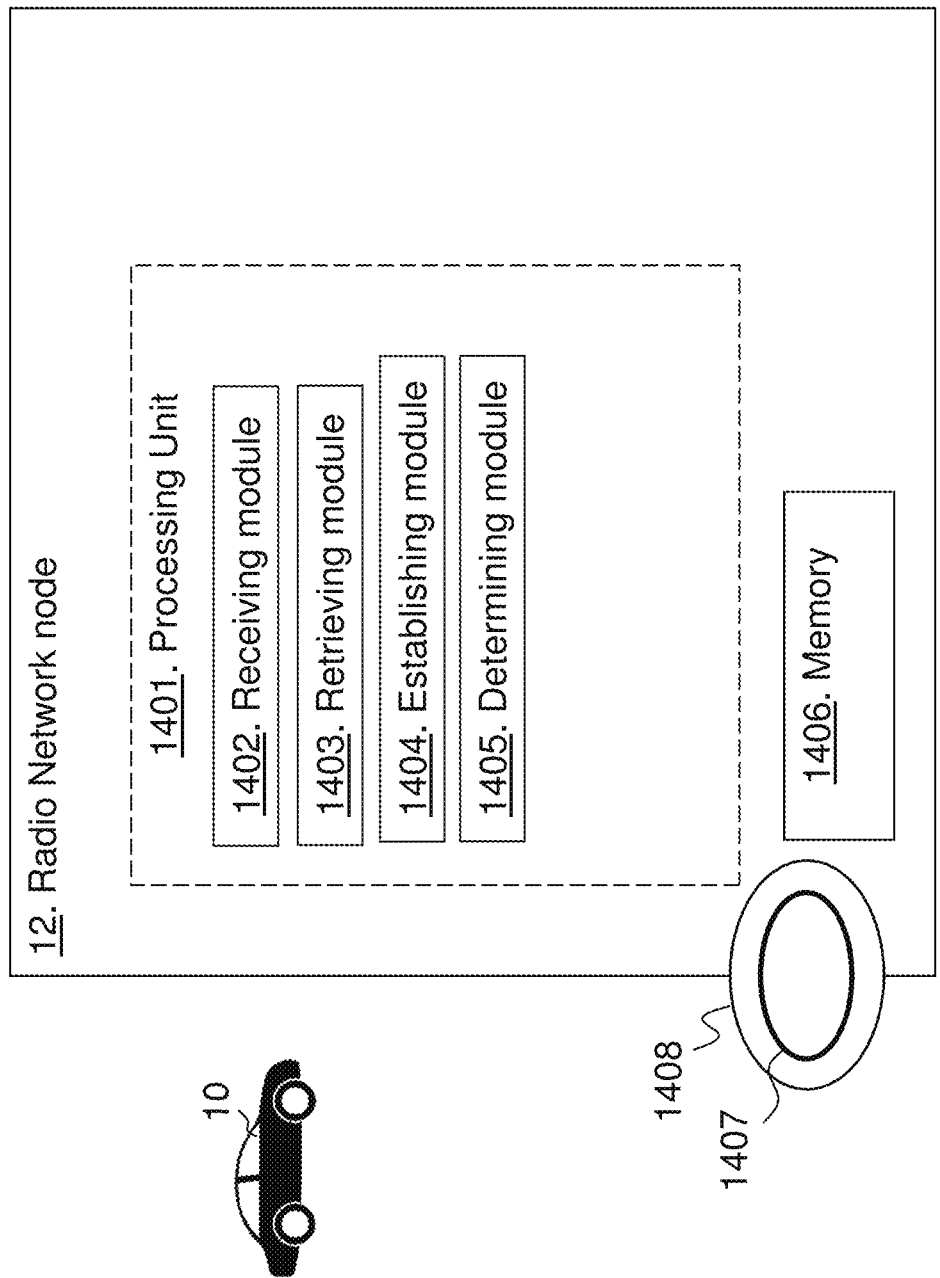
FIG. 14 is a block diagram depicting a radio network node according to embodiments herein.

FIG. 14 is a block diagram depicting the radio network node 12 for enabling communication for the wireless device 10 in the communication network 1. The communication network 1 comprises the core network with partitioned sets of functionalities where the first core network node 13 supports the first set of functionalities out of the total set of functionalities in the core network of the communication network 1. The first set of functionalities belongs to the first network slice of the core network and is separated from another set of functionalities out of the total set of functionalities in the core network. The radio network node 12 may comprise a processing unit 1401 such as one or more processors configured to perform the methods herein.

The radio network node 12 is configured to receive the connection request from the wireless device 10 comprising the indication, which indication indicates connection to the first network slice. The radio network node 12 may comprise a receiving module 1402. The processing unit 1401 and/or the receiving module 1402 may be configured to receive the connection request from the wireless device 10 comprising the indication.

The radio network node 12 is configured to retrieve the configuration information from the network node 16, for establishing the connection interface to the first network slice. The radio network node 12 may be configured to retrieve the configuration information by being configured to request in a configuration request, from the network node 16, the configuration information and/or configuration of a transport network, CN and/or RAN, between the radio network node 12 and the first core network node 13. The radio network node 12 may be configured to retrieve the configuration information by being configured to receive the response comprising the configuration information from one network node, such as the base MME, Radio SDN node, or an Operation Support System node, such as a RAN OSS node. The radio network node 12 may comprise a retrieving module 1403. The processing unit 1401 and/or the retrieving module 1403 may be configured to retrieve the configuration information from the network node 16, for establishing the connection interface to the first network slice. The processing unit 1401 and/or the retrieving module 1403 may be configured to retrieve the configuration information by being configured to request in the configuration request, from the network node 16, the configuration information and/or configuration of a transport network, CN and/or RAN, between the radio network node 12 and the first core network node 13. The processing unit 1401 and/or the retrieving module 1403 may be configured to retrieve the configuration information by being configured to receive the response comprising the configuration information from one network node, such as the base MME, Radio SDN node, or an Operation Support System node, such as a RAN OSS node.

The radio network node 12 is further configured to establish the connection interface towards the first core network node 13 using the retrieved configuration information. The radio network node 12 may comprise an establishing module 1404. The processing unit 1401 and/or the establishing module 1404 may be configured to establish the connection interface towards the first core network node 13 using the retrieved configuration information.

The radio network node 12 may further be configured to determine that an established connection interface to the first core network node 13 is lacking before retrieving the configuration information. The radio network node 12 may comprise a determining module 1405. The processing unit 1401 and/or the determining module 1405 may be configured to determine that an established connection interface to the first core network node 13 is lacking before retrieving the configuration information.

The radio network node 12 further comprises a memory 1406. The memory comprises one or more units to be used to store data on, such as sets of functionalities, Slice indications, identities of network slices, indications, configuration information, support indications, S1 interface mappings to network slices, applications to perform the methods disclosed herein when being executed, and similar.

The methods according to the embodiments described herein for the radio network node 12 are respectively implemented by means of e.g. a computer program 1407 or a computer program product, comprising instructions, i.e., software code portions, which, when executed on at least one processor, cause the at least one processor to carry out the actions described herein, as performed by the radio network node 12. The computer program 1407 may be stored on a computer-readable storage medium 1408, e.g. a disc or similar. The computer-readable storage medium 1408, having stored thereon the computer program, may comprise the instructions which, when executed on at least one processor, cause the at least one processor to carry out the actions described herein, as performed by the radio network node 12. In some embodiments, the computer-readable storage medium may be a non-transitory computer-readable storage medium.

Figure 15:
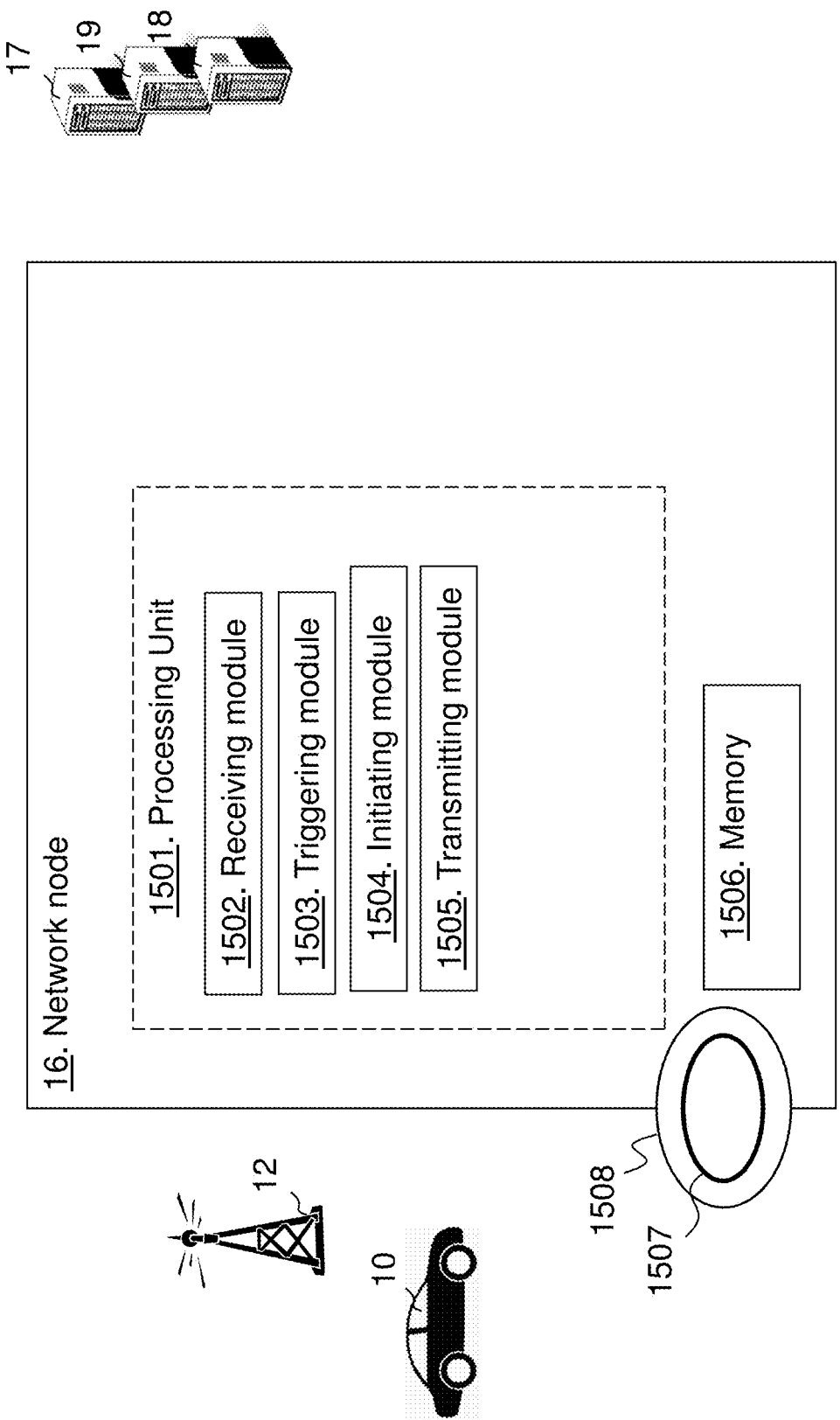
FIG. 15 is a block diagram depicting a network node according to embodiments herein.

FIG. 15 is a block diagram depicting the network node 16, such as a base MME, Radio SDN node, or a Radio OSS node, for enabling communication for the wireless device 10 in the communication network 1. The communication network 1 comprises the core network with partitioned sets of functionalities where the first core network node 13 supports the first set of functionalities out of the total set of functionalities in the core network of the communication network 1. The first set of functionalities belongs to the first network slice of the core network and is separated from another set of functionalities out of the total set of functionalities in the core network. The network node 16 may comprise a processing unit 1501 such as one or more processors configured to perform the methods herein.

The network node 16 is configured to receive the configuration request from the radio network node 12, requesting to establish the connection interface to the first network slice. The network node 16 may comprise a receiving module 1502. The processing unit 1501 and/or the receiving module 1502 may be configured to receive the configuration request from the radio network node 12, requesting to establish the connection interface to the first network slice.

The network node 16 is configured to trigger configuration of the transport network, e.g. RAN and/or CN, between the radio network node 12 and the first core network node 13. The network node 16 may be configured to trigger configuration of the transport network by being configured to transmit a request to the configuration control node 17, which request requests the configuration of the transport network between the radio network node 12 and the first core network node 13. The network node 16 may be configured to trigger configuration of the transport network by being configured to transmit a slice configuration request to the database 18 for retrieving slice configuration information for the first network slice; receive the slice configuration information from the database 18; and to transmit a transport request requesting the control network node 19 for configuring the transport network, RAN and/or CN, between the radio network node 12 and the first core network node 13, which transport request comprises at least a part of the slice configuration information. The network node 16 may comprise a triggering module 1503. The processing unit 1501 and/or the triggering module 1503 may be configured to trigger configuration of the transport network, e.g. RAN and/or CN, between the radio network node 12 and the first core network node 13. The processing unit 1501 and/or the triggering module 1503 may be configured to trigger configuration of the transport network by being configured to transmit a request to the configuration control node 17, which request requests the configuration of the transport network between the radio network node 12 and the first core network node 13. The processing unit 1501 and/or the triggering module 1503 may be configured to trigger configuration of the transport network by being configured to transmit a slice configuration request to the database 18 for retrieving slice configuration information for the first network slice; receive the slice configuration information from the database 18; and to transmit a transport request requesting the control network node 19 for configuring the transport network, RAN and/or CN, between the radio network node 12 and the first core network node 13, which transport request comprises at least a part of the slice configuration information.

The network node 16 is further configured to initiate the transmission of configuring information, to the radio network node 12, for establishing the connection interface to the first network slice from the radio network node 12. The network node 16 may be configured to initiate the transmission of configuring information by being configured to transmit a request for radio transport configuration to an Operations Support System node. The network node 16 may comprise an initiating module 1504. The processing unit 1501 and/or the initiating module 1504 may be configured to initiate the transmission of configuring information, to the radio network node 12, for establishing the connection interface to the first network slice from the radio network node 12. The processing unit 1501 and/or the initiating module 1504 may be configured to initiate the transmission of configuring information by being configured to transmit a request for radio transport configuration to the Operations Support System node.

The network node 16 is further configured to transmit core configuration information to the first core network node 13, which core configuration information informs local configuration of the core network to establish connection towards the radio network node 12, and/or access configuration information to the radio network node 12, which access configuration information informs configuration of the radio access network to establish connection towards the first core network node 13. The network node 16 may comprise a transmitting module 1505. The processing unit 1501 and/or the transmitting module 1505 may be configured to transmit core configuration information to the first core network node 13, which core configuration information informs local configuration of the core network to establish connection towards the radio network node 12, and/or access configuration information to the radio network node 12, which access configuration information informs configuration of the radio access network to establish connection towards the first core network node 13.

The network node 16 further comprises a memory 1506. The memory comprises one or more units to be used to store data on, such as sets of functionalities, Slice indications, identities of network slices, indications, configuration information, support indications, S1 interface mappings to network slices, applications to perform the methods disclosed herein when being executed, and similar.

The methods according to the embodiments described herein for the network node 16 are respectively implemented by means of e.g. a computer program 1507 or a computer program product, comprising instructions, i.e., software code portions, which, when executed on at least one processor, cause the at least one processor to carry out the actions described herein, as performed by the network node 16. The computer program 1507 may be stored on a computer-readable storage medium 1508, e.g. a disc or similar. The computer-readable storage medium 1508, having stored thereon the computer program, may comprise the instructions which, when executed on at least one processor, cause the at least one processor to carry out the actions described herein, as performed by the network node 16. In some embodiments, the computer-readable storage medium may be a non-transitory computer-readable storage medium.

Figure 16:
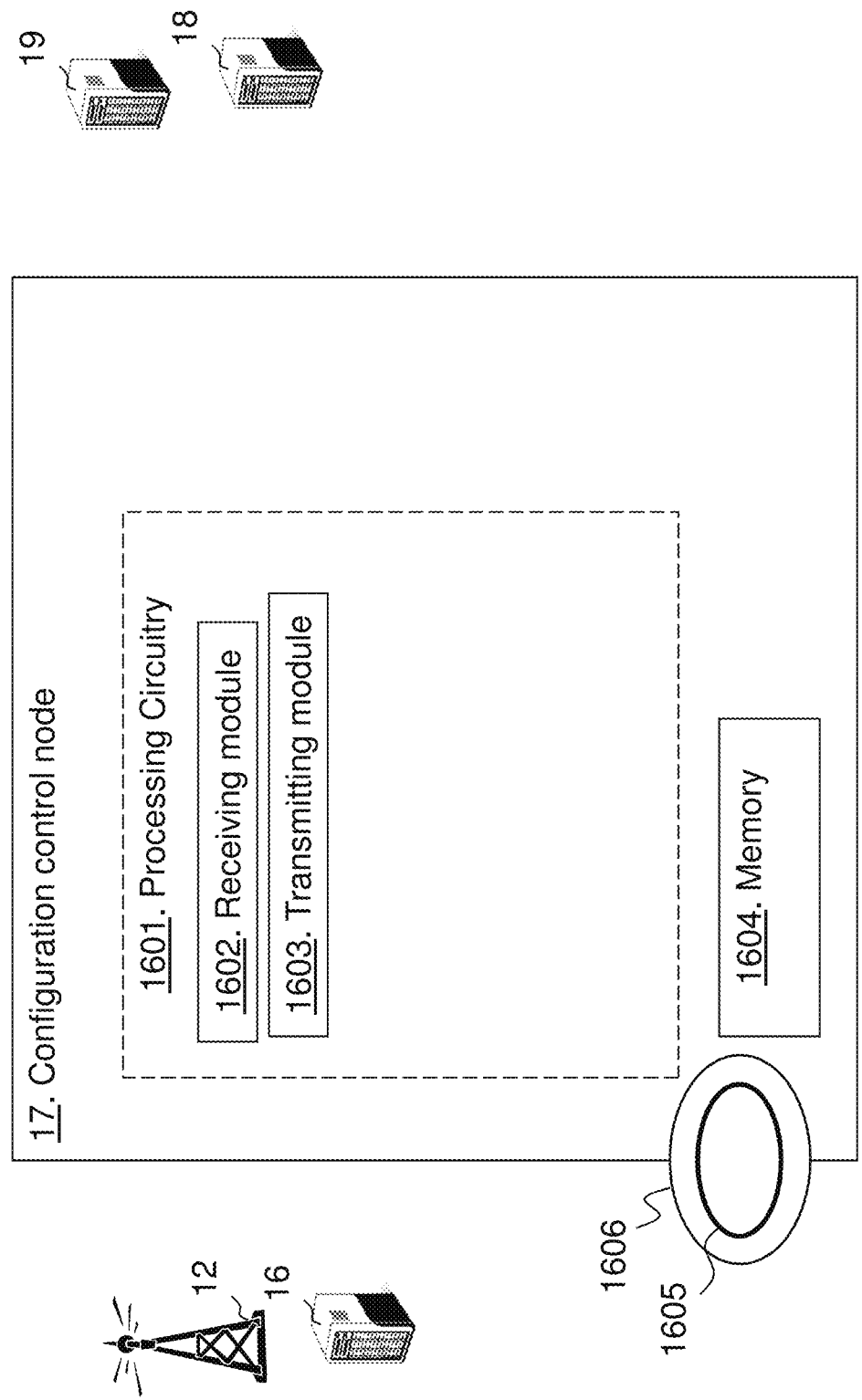
FIG. 16 is a block diagram depicting a configuration control node according to embodiments herein.

FIG. 16 is a block diagram depicting the configuration control node 17, such as a Radio SDN node, for enabling communication for the wireless device 10 in the communication network 1. The communication network 1 comprises the core network with partitioned sets of functionalities where the first core network node 13 supports the first set of functionalities out of the total set of functionalities in the core network of the communication network. The first set of functionalities belongs to the first network slice of the core network and is separated from another set of functionalities out of the total set of functionalities in the core network. The configuration control node 17 may comprise a processing unit 1601 such as one or more processors configured to perform the methods herein.

The configuration control node 17 is configured to receive the request from the network node 16, which request requests a configuration of the transport network, CN and/or RAN, between the radio network node 12 associated with the wireless device 10 and the first core network node 13. The configuration control node 17 may comprise a receiving module 1602. The processing unit 1601 and/or the receiving module 1602 may be configured to receive the request from the network node 16, which request requests a configuration of the transport network, CN and/or RAN, between the radio network node 12 associated with the wireless device 10 and the first core network node 13.

The configuration control node 17 is configured to transmit the slice configuration request to the database 18 for retrieving slice configuration information for the first network slice. The configuration control node 17 may comprise a transmitting module 1603. The processing unit 1601 and/or the transmitting module 1603 may be configured to transmit the slice configuration request to the database 18 for retrieving slice configuration information for the first network slice.

The configuration control node 17 is configured to receive the slice configuration information from the database 18. The processing unit 1601 and/or the receiving module 1602 may be configured to receive the slice configuration information from the database 18.

The configuration control node 17 is configured to transmit the transport request requesting the control network node 19 for configuring the transport network between the radio network node 12 and the first core network node 13, which transport request comprises at least a part of the slice configuration information. The processing unit 1601 and/or the transmitting module 1603 may be configured to transmit the transport request requesting the control network node 19 for configuring the transport network between the radio network node 12 and the first core network node 13, which transport request comprises at least a part of the slice configuration information.

The configuration control node 17 may be configured to receive an acknowledgment, from the control network node 19, confirming the transport network setup towards the first core network node 13. The processing unit 1601 and/or the receiving module 1602 may be configured to receive the acknowledgment, from the control network node 19, confirming the transport network setup towards the first core network node 13.

The configuration control node 17 may be configured to transmit a response of the received request from the network node, to the network node 16, confirming the transport network setup towards the first core network node 13. The processing unit 1601 and/or the transmitting module 1603 may be configured to transmit the response, to the network node 16, confirming the transport network setup towards the first core network node 13. The response may comprise configuration information for establishing the connection interface between the radio network node and the first core network node.

The configuration control node 17 further comprises a memory 1604. The memory comprises one or more units to be used to store data on, such as sets of functionalities, Slice indications, identities of network slices, indications, configuration information, support indications, S1 interface mappings to network slices, applications to perform the methods disclosed herein when being executed, and similar.

The methods according to the embodiments described herein for the configuration control node 17 are respectively implemented by means of e.g. a computer program 1605 or a computer program product, comprising instructions, i.e., software code portions, which, when executed on at least one processor, cause the at least one processor to carry out the actions described herein, as performed by the configuration control node 17. The computer program 1605 may be stored on a computer-readable storage medium 1606, e.g. a disc or similar. The computer-readable storage medium 1606, having stored thereon the computer program, may comprise the instructions which, when executed on at least one processor, cause the at least one processor to carry out the actions described herein, as performed by the configuration control node 17. In some embodiments, the computer-readable storage medium may be a non-transitory computer-readable storage medium.

Figure 17:
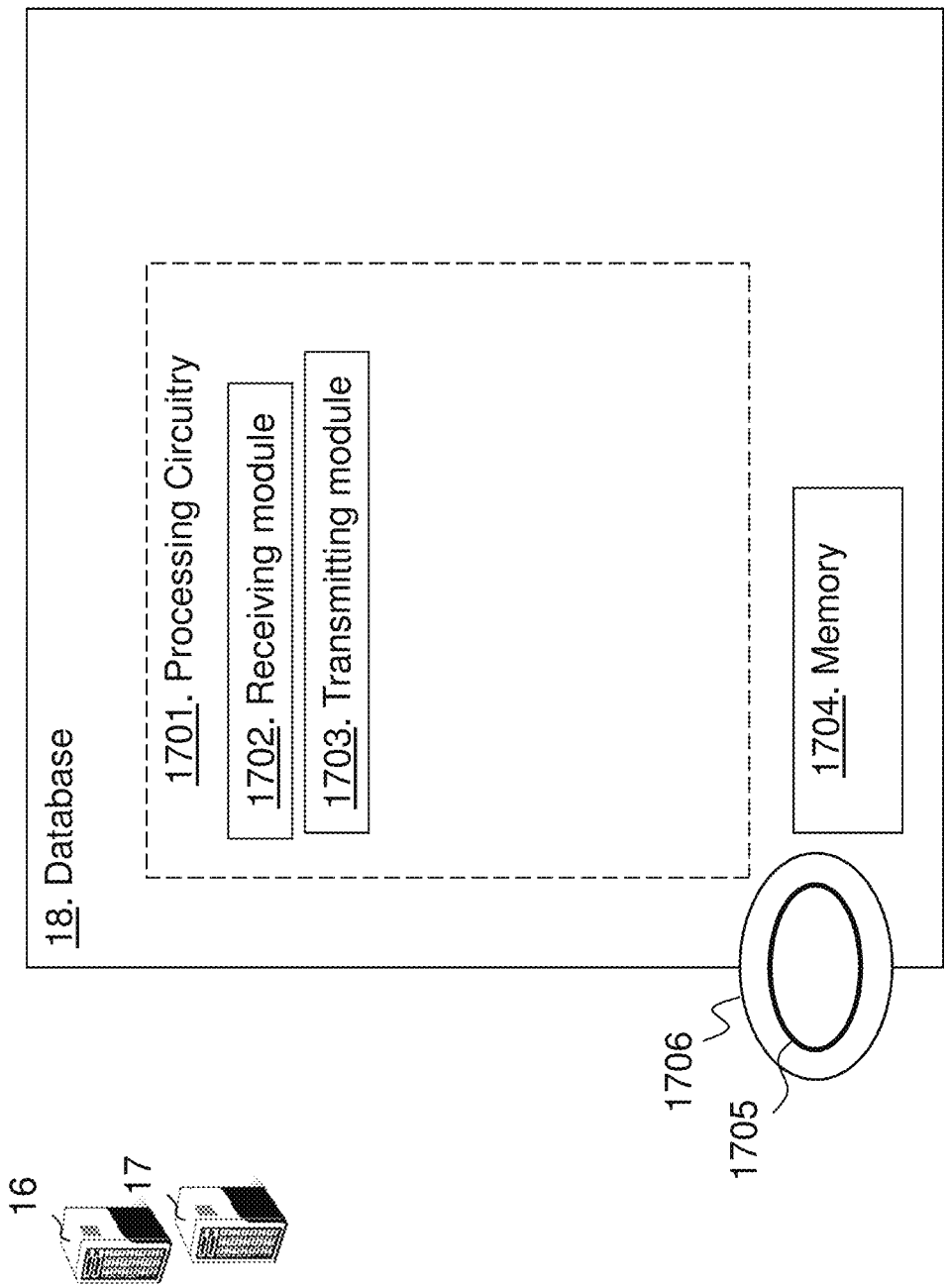
FIG. 17 is a block diagram depicting a database according to embodiments herein.

FIG. 17 is a block diagram depicting the database 18 for enabling communication for the wireless device 10 in the communication network 1. The communication network 1 comprises the core network with partitioned sets of functionalities where the first core network node 13 supports the first set of functionalities out of the total set of functionalities in the core network of the communication network. The first set of functionalities belongs to the first network slice of the core network and is separated from another set of functionalities out of the total set of functionalities in the core network. The database 18 may comprise a processing unit 1701 such as one or more processors configured to perform the methods herein.

The database 18 is configured to receive the slice configuration request from the configuration control node 17 for retrieving slice configuration information for the first network slice. The database 18 may comprise a receiving module 1702. The processing unit 1701 and/or the receiving module 1702 may be configured to receive the slice configuration request from the configuration control node 17 for retrieving slice configuration information for the first network slice.

The database 18 is configured to transmit the slice configuration information to the configuration control node 17. The database 18 may comprise a transmitting module 1703. The processing unit 1701 and/or the transmitting module 1703 may be configured to transmit the slice configuration information to the configuration control node 17.

The database 18 may be configured to transmit transport configuration information upon request or query from the control network node 19. The transport configuration information informs transport configuration of the network to establish connection between the radio network node 12 and the first core network node 13 in the communication network 1. The processing unit 1701 and/or the transmitting module 1703 may be configured to transmit transport the configuration information upon request or query from the control network node 19. The database 18, e.g. the processing unit 1701 and/or the transmitting module 1703, may be configured to transmit core configuration information to the first core network node 13, which core configuration information informs local configuration of the core network to establish connection towards the radio network node 12 in the communication network 1.

The database 18 further comprises a memory 1704. The memory comprises one or more units to be used to store data on, such as all transport configuration information, e.g. VLAN-ID's, VPN ID's etc. with local significance, for Radio and Core Network nodes, thus RAN/Core decides them, sets of functionalities, identities of network slices, support indications, S1 interface mappings to network slices, applications to perform the methods disclosed herein when being executed, and similar.

The methods according to the embodiments described herein for the database 18 are respectively implemented by means of e.g. a computer program 1705 or a computer program product, comprising instructions, i.e., software code portions, which, when executed on at least one processor, cause the at least one processor to carry out the actions described herein, as performed by the database 18. The computer program 1705 may be stored on a computer-readable storage medium 1706, e.g. a disc or similar. The computer-readable storage medium 1706, having stored thereon the computer program, may comprise the instructions which, when executed on at least one processor, cause the at least one processor to carry out the actions described herein, as performed by the database 18. In some embodiments, the computer-readable storage medium may be a non-transitory computer-readable storage medium.

Embodiments herein relate to a network with network slices i.e. core network with partitioned sets of functionalities where network node 13 supports the first set of functionalities out of the total set of functionalities in the core network of the communication network. The first set of functionalities belongs to the first network slice of the core network, and is separated from another set of functionalities out of the total set of functionalities in the core network.

As will be readily understood by those familiar with communications design, that functions, means, or modules may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a radio network node, a network node, configuration control node or a database, for example.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of communications devices will appreciate the cost, performance, and maintenance trade-offs inherent in these design choices.

It will be appreciated that the foregoing description and the accompanying drawings represent non-limiting examples of the methods and apparatus taught herein. As such, the apparatus and techniques taught herein are not limited by the foregoing description and accompanying drawings. Instead, the embodiments herein are limited only by the following claims and their legal equivalents.

The invention claimed is:

1. A method for enabling communication for a wireless device in a communication network, the communication network comprising a radio network node, a network node, a configuration control node, and a database, wherein the communication network comprises a core network with partitioned sets of functionalities, wherein a first core network node supports a first set of functionalities out of a total set of functionalities in the core network of the communication network, and wherein the first set of functionalities belongs to a first network slice of the core network and is separated from another set of functionalities out of the total set of functionalities in the core network, the method comprising:

receiving, at the radio network node, a connection request from the wireless device comprising an indication, wherein the indication indicates connection to the first network slice;

transmitting a configuration request, from the radio network node to the network node, requesting to establish a connection interface to the first network slice;

transmitting a request from the network node to the configuration control node or within the network node, wherein the request requests a configuration of a transport network between the radio network node associated with the wireless device and the first core network node;

transmitting, from the configuration control node or the network node, a slice configuration request to the database for retrieving slice configuration information for the first network slice;

receiving the slice configuration information from the database;

transmitting, from the configuration control node or the network node, a transport request requesting a control network node for configuring the transport network;

upon confirmation of setup of the transport network, transmitting configuration information from the network node to the radio network node for establishing the connection interface to the first network slice; and establishing, at the radio network node, the connection interface towards the first core network node using the configuration information.

2. A radio network node for enabling communication for a wireless device in a communication network, the communication network comprising a core network with partitioned sets of functionalities, wherein a first core network node supports a first set of functionalities out of a total set of functionalities in the core network of the communication network, and wherein the first set of functionalities belongs to a first network slice of the core network and is separated from another set of functionalities out of the total set of functionalities in the core network, the radio network node comprising:
one or more processors; and
memory comprising instructions which, when executed by the one or more processors, cause the radio network node to:
receive a connection request from the wireless device, comprising an indication, wherein the indication indicates connection to the first network slice;
retrieve configuration information, from a network node, for establishing a connection interface to the first network slice; and
establish the connection interface towards the first core network node using the retrieved configuration information.

3. The radio network node according to claim 2, wherein the instructions which, when executed by the one or more processors, further cause the radio network node to:
determine that the established connection interface towards the first core network node is lacking before retrieval of the configuration information.

4. The radio network node according to claim 2, wherein the instructions which, when executed by the one or more processors, cause the radio network node to retrieve the configuration information by being configured to request, in a configuration request from the network node, the configuration information and/or configuration of a transport network between the radio network node and the first core network node.

5. The radio network node according to claim 2, wherein the instructions which, when executed by the one or more processors, cause the radio network node to retrieve the configuration information by being configured to receive a response comprising the configuration information from the network node.

6. A network node for enabling communication for a wireless device in a communication network, the communication network comprising a core network with partitioned sets of functionalities, wherein a first core network node supports a first set of functionalities out of a total set of functionalities in the core network of the communication network, and wherein the first set of functionalities belongs to a first network slice of the core network and is separated from another set of functionalities out of the total set of functionalities in the core network, the network node comprising:
one or more processors; and
memory comprising instructions which, when executed by the one or more processors, cause the network node to:
receive a configuration request, from a radio network node, requesting to establish a connection interface to the first network slice;
trigger configuration of a transport network between the radio network node and the first core network node; and
initiate a transmission of configuration information, to the radio network node, for establishing the connection interface to the first network slice from the radio network node.

7. The network node according to claim 6, wherein the instructions which, when executed by the one or more processors, cause the network node to trigger the configuration of the transport network by being configured to transmit a request to a configuration control node, and wherein the request requests the configuration of the transport network between the radio network node and the first core network node.

8. The network node according to claim 6, wherein the instructions which, when executed by the one or more processors, cause the network node to trigger the configuration of the transport network by being configured to:
transmit a slice configuration request to a database for retrieving slice configuration information for the first network slice;
receive the slice configuration information from the database; and
transmit a transport request requesting a control network node for configuring the transport network between the radio network node and the first core network node, wherein the transport request comprises at least a part of the slice configuration information.

9. The network node according to claim 6, wherein the instructions which, when executed by the one or more processors, cause the network node to initiate the transmission of the configuration information by being configured to transmit a request for radio transport configuration to an Operations Support System node.

10. The network node according to claim 6, wherein the instructions which, when executed by the one or more processors, further cause the network node to:
transmit core configuration information to the first core network node, wherein the core configuration information informs local configuration of the core network to establish connection towards the radio network node, and/or transmit access configuration information to the radio network node, and wherein the access configuration information informs configuration of a radio access network to establish connection towards the first core network node.

11. A configuration control node for enabling communication for a wireless device in a communication network, the communication network comprising a core network with partitioned sets of functionalities, wherein a first core network node supports a first set of functionalities out of a total set of functionalities in the core network of the communication network, and wherein the first set of functionalities belongs to a first network slice of the core network and is separated from another set of functionalities out of the total set of functionalities in the core network, the configuration control node comprising:
- one or more processors; and
- memory comprising instructions which, when executed by the one or more processors, cause the configuration control node to:
  - receive a request from a network node, wherein the request requests a configuration of a transport network between a radio network node associated with the wireless device and the first core network node;
  - transmit a slice configuration request to a database for retrieving slice configuration information for the first network slice;
  - receive the slice configuration information from the database; and
  - transmit a transport request requesting a control network node for configuring the transport network between the radio network node and the first core network node, wherein the transport request comprises at least a part of the slice configuration information.

12. The configuration control node according to claim 11, wherein the instructions which, when executed by the one or more processors, further cause the configuration control node to:
- receive an acknowledgment, from the control network node, confirming a setup of the transport network towards the first core network node, and
- transmit a response to the received request, to the network node, confirming the setup of the transport network towards the first core network node, wherein the received request comprises configuration information for establishing a connection interface between the radio network node and the first core network node.

13. A non-transitory computer-readable storage medium, having stored thereon a computer program for enabling communication for a wireless device in a communication network, the communication network comprising a core network with partitioned sets of functionalities, wherein a first core network node supports a first set of functionalities out of a total set of functionalities in the core network of the communication network, wherein the first set of functionalities belongs to a first network slice of the core network and is separated from another set of functionalities out of the total set of functionalities in the core network, and wherein the computer program comprises instructions which, when executed by one or more processors, cause the one or more processors to:
- receive a slice configuration request from a configuration control node for retrieving slice configuration information for the first network slice; and
- transmit the slice configuration information to the configuration control node.

14. The non-transitory computer-readable storage medium according to claim 13, wherein the instructions which, when executed by the one or more processors, further cause the one or more processors to, when acting as a core network node, transmit core configuration information to the first core network node, and wherein the core configuration information informs local configuration of the core network to establish connection towards a radio network node in the communication network.

* * * * *